United States Patent
Koike

(10) Patent No.: US 10,628,360 B2
(45) Date of Patent: Apr. 21, 2020

(54) DATA PROCESSOR USING A RING BUS AND METHOD FOR CONTROLLING THE SAME

(71) Applicant: RENESAS ELECTRONICS CORPORATION, Tokyo (JP)

(72) Inventor: Manabu Koike, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/178,302

(22) Filed: Nov. 1, 2018

(65) Prior Publication Data

US 2019/0196998 A1  Jun. 27, 2019

(30) Foreign Application Priority Data

Dec. 21, 2017  (JP) ................. 2017-244905

(51) Int. Cl.
| | |
|---|---|
| G06F 13/16 | (2006.01) |
| G06F 13/372 | (2006.01) |
| G06F 13/42 | (2006.01) |
| G06F 13/36 | (2006.01) |
| G06F 13/374 | (2006.01) |
| G06F 13/40 | (2006.01) |

(52) U.S. Cl.
CPC ........... *G06F 13/372* (2013.01); *G06F 13/36* (2013.01); *G06F 13/374* (2013.01); *G06F 13/40* (2013.01); *G06F 13/4247* (2013.01)

(58) Field of Classification Search
CPC combination set(s) only.
See application file for complete search history.

(56) References Cited

U.S. PATENT DOCUMENTS 4,646,232 A * 2/1987 Chang ................... G06F 13/128
710/113
4,680,757 A * 7/1987 Murakami ............ H04L 12/433
370/455

(Continued)

FOREIGN PATENT DOCUMENTS

| JP | 59-107664 A | 6/1984 |
| WO | 2008/008220 A1 | 1/2008 |

OTHER PUBLICATIONS

Extended European Search Report issued in corresponding European Patent Application No. 18209708.9-1224, dated Aug. 8, 2019.

*Primary Examiner* — Raymond N Phan
(74) *Attorney, Agent, or Firm* — McDermott Will & Emery LLP

(57) ABSTRACT

A data processor capable of suppressing variation in latency during a bus access is provided. The data processor according to one embodiment includes a ring bus through which a plurality of relay circuits, being coupled to a plurality of bus masters and a plurality of slaves, are coupled in the shape of a ring. Each of the relay circuits includes: an arbitration circuit which arbitrates an adjacent request packet of an adjacent relay circuit and a bus request packet of a nearest bus master with use of priority of these request packets, and outputs the request packet after arbitration to a next relay circuit; and a priority adjustment circuit which adjusts priority of the bus request packet according to the number of relay circuits through which the bus request packet passes before reaching its destination.

14 Claims, 10 Drawing Sheets

(56) References Cited

U.S. PATENT DOCUMENTS

| | | | | |
|---|---|---|---|---|
| 4,726,018 | A | * | 2/1988 | Bux ..................... H04L 12/433 370/455 |
| 5,598,414 | A | * | 1/1997 | Walser ................. H04L 12/422 370/455 |
| 7,574,547 | B1 | * | 8/2009 | Avudaiyappan .......... G06F 9/52 370/395.42 |
| 2003/0212812 | A1 | * | 11/2003 | Wang ................. H04J 14/0227 709/234 |
| 2017/0075838 | A1 | | 3/2017 | Nooney et al. |

* cited by examiner

DATA PROCESSOR USING A RING BUS AND METHOD FOR CONTROLLING THE SAME

CROSS-REFERENCE TO RELATED APPLICATIONS

The disclosure of Japanese Patent Application No. 2017-244905 filed on Dec. 21, 2017 including the specification, drawings and abstract is incorporated herein by reference in its entirety.

BACKGROUND

The present invention relates to a data processor and a method for controlling the same and, for example, it relates to a data processor having a ring bus and a method for controlling the same.

In recent years, data processing devices have been more advanced in terms of the high performance and functions. Accordingly, the number of bus masters and the number of slaves included in the data processing devices tend to increase. As a result, the number of wirings for coupling the bus masters and the slaves is increasing, and to ease this wiring concentration has become an important problem to be solved. For example, using ring-type bus topology for coupling a plurality of bus masters and a plurality of slaves can ease the wiring concentration more than using the star-type topology.

Patent Document 1 discloses a technology related to a data transmission system including: a plurality of relay devices coupled to a ring bus; and an adapter for controlling an interface between each relay device and a node.

PATENT DOCUMENT

[Patent Document 1] Japanese Unexamined Patent Application Publication No. Sho 59(1984)-107664

SUMMARY

As described above, using ring-type bus topology for coupling the bus masters with the slaves can ease wiring concentration more than using star-type bus topology.

However, in the case where the ring-type bus topology is used for coupling the bus masters and the slaves, there is more variation arising in latency of the bus access than in the case where the star-type bus topology is used. That is, if the ring bus is used, variation occurs in distance of the ring bus when each bus master makes an access to each slave, causing variation in latency of the bus access.

Other objects and novel features of the present invention will become apparent from the description of the present specification and the accompanying drawings.

A data processor according one embodiment include a ring bus through which a plurality of relay circuits are coupled in the shape of a ring. When arbitrating an adjacent request packet being a request packet of an adjacent relay circuit and a bus request packet being a request packet of a nearest bus master, with use of priority of the adjacent request packet and priority of the bus request packet, the relay circuit adjusts the priority of the bus request packet according to the number of relay circuits through which the bus request packet passes before reaching its destination.

According to one embodiment described above, a data processor capable of suppressing variation in latency of a bus access and a method for controlling the data processor can be provided.

DETAILED DESCRIPTION

Embodiment 1

Figure 1:
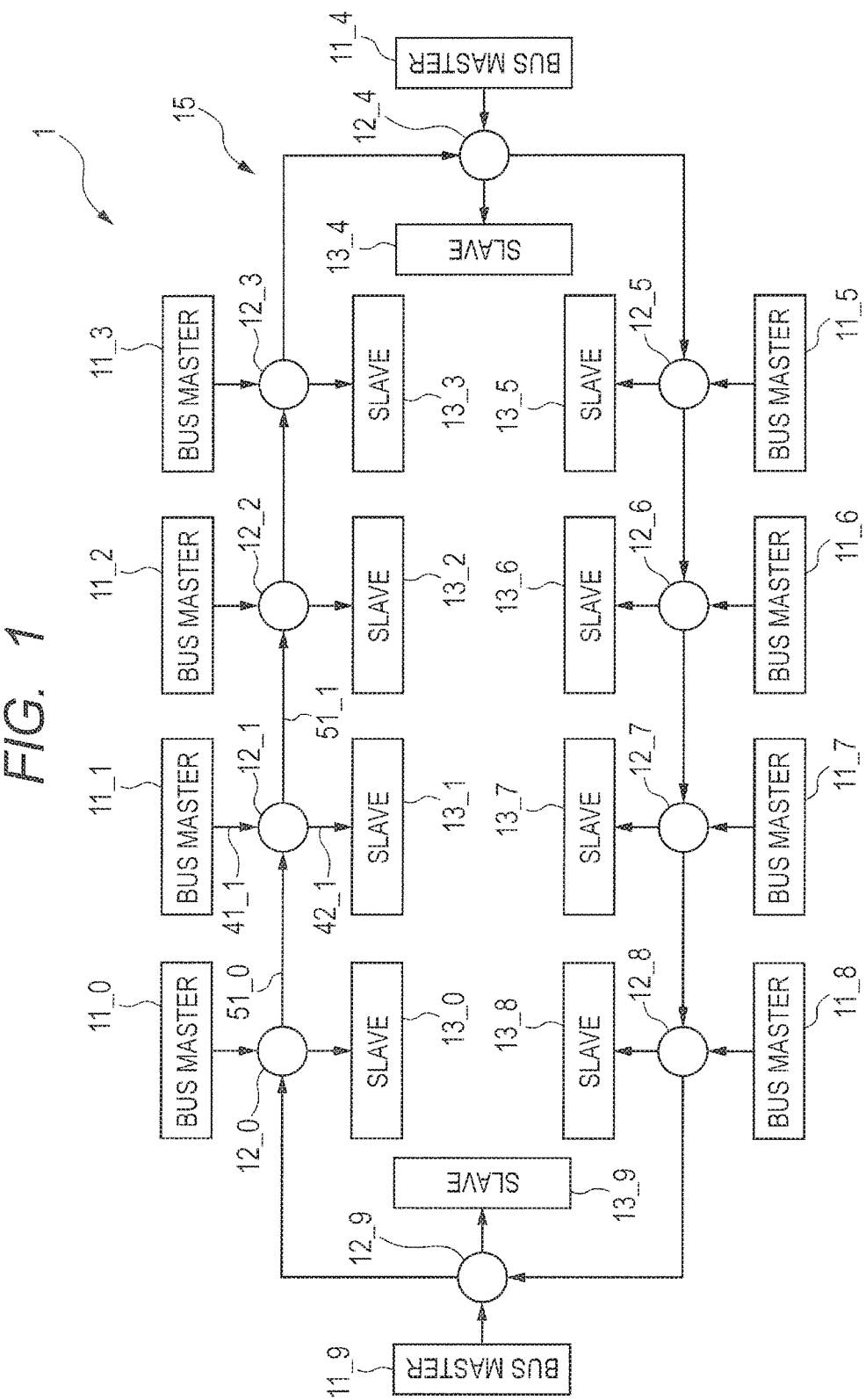
FIG. 1 is a block diagram showing a configuration example of a data processor according to Embodiment 1.

Hereafter, with reference to the drawings, Embodiment 1 will be explained. FIG. 1 is a block diagram showing a configuration example of the data processor according to Embodiment 1. As shown in FIG. 1, the data processor 1 includes: a plurality of bus masters 11_0 to 11_9; a plurality of relay circuits 12_0 to 12_9; and a plurality of slaves 13_0 to 13_9.

Each of the relay circuit 12_0 to 12_9 is coupled to each of the bus masters 11_0 to 11_9 and each of the slaves 13_0 to 13_9. The relay circuits 12_0 to 12_9 are coupled, via the ring bus 15, in the shape of a ring. Therefore, each of the bus masters 11_0 to 11_9 can make access to each of the slaves 13_0 to 13_9 via each of the relay circuits 12_0 to 12_9, and the ring bus 15.

For example, each of the bus masters 11_0 to 11_9 is a processor, such as a CPU (Central Processing Unit), and is capable of sending a predetermined request packet to each of the slave 13_0 to 13_9. Each of the slaves 13_0 to 13_9 is a memory circuit, such as a flash memory and an SRAM (Static Random Access Memory), for example. Corresponding to a request from each of the bus masters 11_0 to 11_9, each of the slaves 13_0 to 13_9 can store data sent from the bus master and also can send data stored in each slave 13_0 to 13_9 to the bus master. In addition, configurations of the bus master 11_0 to 11_9 and the slaves 13_0 to 13_9 are not limited to those described above, and a user can design them arbitrarily according to the intended use of the data processor 1.

The ring bus 15 is so configured as to be able to transfer data in one direction (clockwise, in FIG. 1). When making access to each of the slaves 13_0 to 13_9, the bus master 11_1 sends a request packet 41_1 (hereafter, sometimes referred to as simply a "request 41_1") described by a predetermined bus protocol to the relay circuit 12_1 to which the bus master 11_1 is directly coupled. The relay circuit 12_1 sends a request packet to a slave 13_1 or the next relay circuit 12_2 using the address of a destination included in the request packet 41_1.

For example, when the address of the destination contained in the request packet 41_1 indicates a slave 13_1, the relay circuit 12_1 sends a request packet 42_1 to the slave 13_1. On the other hand, when the address of the destination contained in the request packet 41_1 indicates one of the slaves 13_0 and 13_2 to 13_9, the relay circuit 12_1 sends a request packet 51_1 to the next relay circuit 12_2.

For example, when the bus master 11_1 makes an access to a slave 13_8, that is, an address of a destination contained in the request packet 41_1 indicates a slave 13_8, the request packet 41_1 outputted from the bus master 11_1 is sent to the slave 13_8 via the relay circuits 12_1 to 12_8, coupled to the ring bus 15, in due order.

Upon receipt of a request packet from the bus master 11_1, the slave 13_8 sends a response packet (data etc.) to the bus master 11_1 via a separately provided ring bus and a relay circuit (not shown in FIG. 1).

Incidentally, in the present embodiment, a case where bus masters 11_0 to 11_9 send request packets to respective slaves 13_0 to 13_9 will be explained. A case where the slaves 13_0 to 13_9 return response packets to respective bus masters 11_0 to 11_9 will be explained in Embodiment 5 (refer to FIG. 11).

Also, in the data processor 1 shown in FIG. 1, as one example, ten bus masters 11_0 to 11_9, ten relay circuits 12_0 to 12_9, and ten slaves 13_0 to 13_9 are provided. However, according to the present embodiment, the number of bus masters, the number of relay circuits, and the number of slaves included in the data processor 1 can be determined arbitrarily.

In the data processor 1 according the present embodiment, in addition to the request packet 41_1 from the bus master 11_1, a request packet 51_0 from an adjacent relay circuit 12_0 (that is, a relay circuit immediately before) is supplied to the relay 12_1. When the adjacent request packet 51_0 being a request packet of the adjacent relay circuit 12_0 and the bus request packed 41_1 being a request packet of the nearest bus master 11_1 conflict with each other, the relay circuit 12_1 arbitrates the adjacent request packet 51_0 and the bus request packet 41_1, and outputs the request packet after arbitration to the slave 13_1 or a next relay circuit 12_2. At this time, with use of the priority of the adjacent request packet 51_0 and the priority of the bus request packet 41_1, the relay circuit 12_1 arbitrates the adjacent request packet 51_0 and the bus request packed 41_1.

Figure 6:
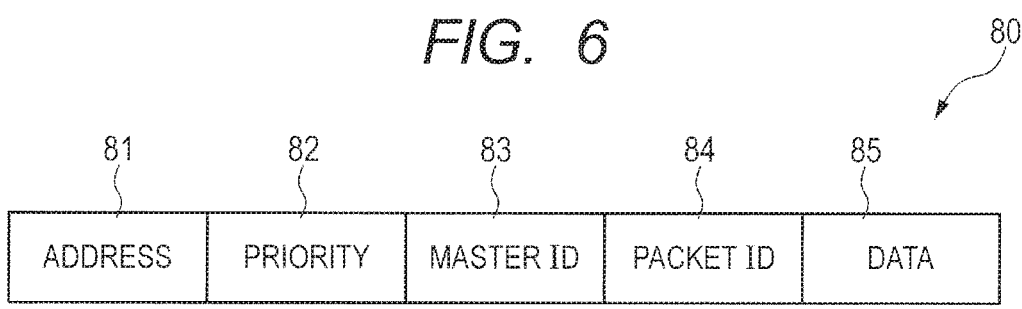
FIG. 6 shows a configuration example of a request packet used in the data processor according to Embodiment 1.

FIG. 6 shows a configuration example of a request packet used in the data processor 1 according to the present embodiment. As shown in FIG. 6, a request packet 80 includes: an address 81; priority 82; a master ID (83); a packet ID (84); and data 85. The address 81 is an address of a destination of the packet 80. The priority 82 indicates the priority of the request packet 80, i.e., the priority at the time of transferring the request packet 80 within the ring bus 15. The relay circuits 12_0 to 12_9 give priority to and transfer a request packet whose priority is higher. The master ID (83) is an ID for specifying the bus masters 11_0 to 11_9 sending the request packet 80. The packed ID (84) is an ID for specifying the request packet 80 itself. The data 85 can be any data such as image data and audio data. In addition, among the request packets 80, there are some request packets which do not contain the data 85.

For example, when the bus master 11_1 reads data stored in the slave 13_8 (for example, flash memory), the bus master 11_1 sends the request packet 80 to the slave 13_8. The data 85 is not contained in the request packet 80 sent at this time. On the other hand, when the bus master 11_1 stores data in the slave 13_8 (for example, flash memory), the bus master 11_1 sends the request packet 80 including the data 85 to the slave 13_8.

Figure 2:
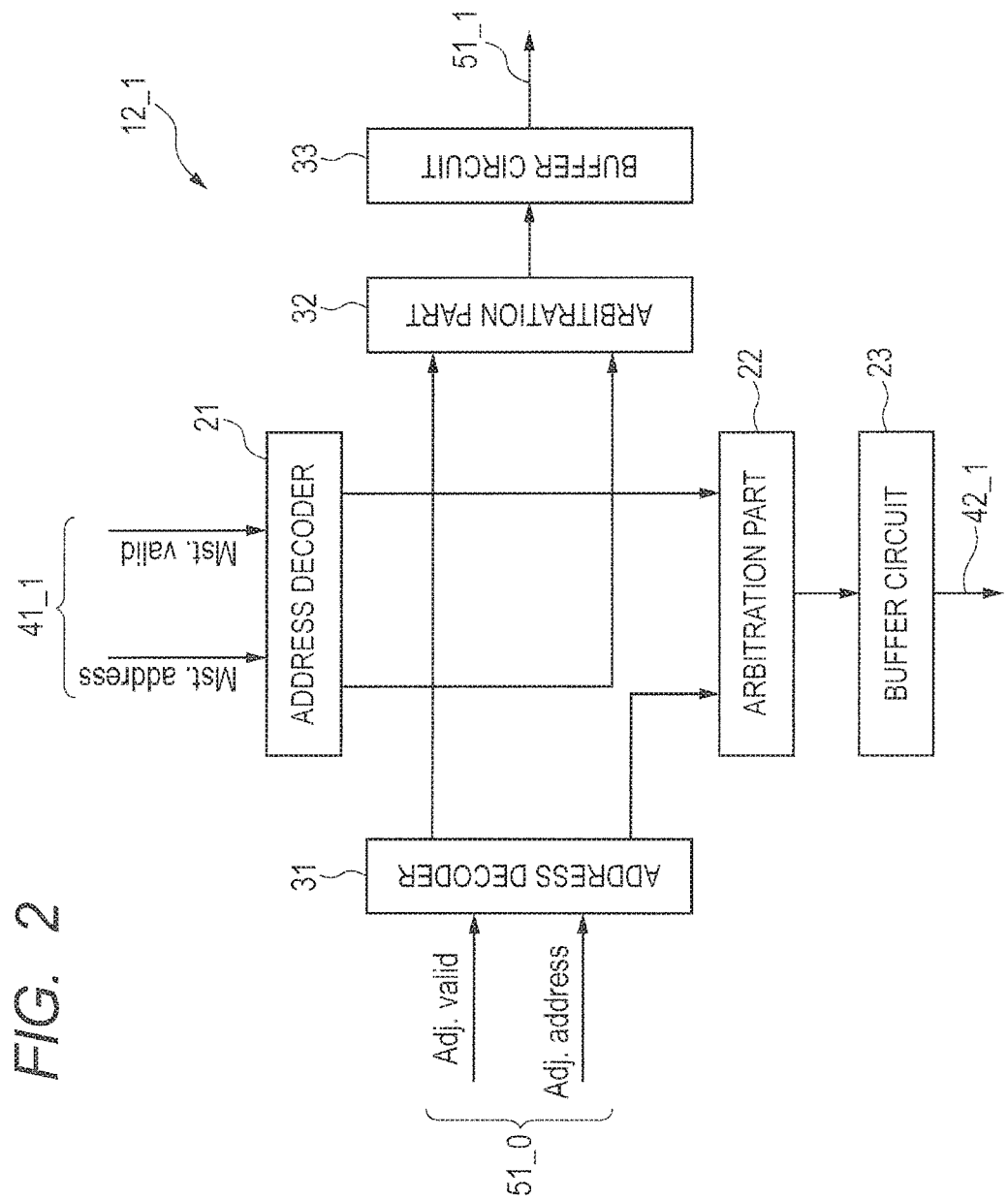
FIG. 2 is a block diagram showing a configuration example of a relay circuit included in the data processor according to Embodiment 1.

Next, configuration examples of the relay circuits 12_0 to 12_9 will be explained. FIG. 2 is a block diagram showing a configuration example of a relay circuit 12_1 included in the data processor 1 according to the present embodiment. As one example, FIG. 2 shows the configuration example of the relay circuit 12_1. However, other relay circuits 12_0 and 12_2 to 12_9 have similar configurations.

As shown in FIG. 2, the relay circuit 12_1 includes: an address decoder 21, an arbitration part 22, a buffer circuit 23, an address decoder 31, an arbitration part 32, and a buffer circuit 33.

The address decoder 21 is so configure as to be able to receive a valid signal (Mst.valid) and an address (Mst.address) contained in the request packet 41_1 sent from the bus master 11_1. When the valid signal is valid (Mst.valid=1), the address decoder 21 decodes the received address (Mst.address). Then, according to the decoded address, the address decoder 21 sends the valid signal (Mst.valid) and priority (Mst.priority) of the request packet 41_1 to the arbitration part 22 or the arbitration part 32. For example, when the decoded address indicates a slave 13_1, the address decoder 21 sends the valid signal (Mst.valid) and the priority (Mst.priority) of the request packet 41_1 to the arbitration part 22. On the other hand, when the decoded address indicates one of slaves 13_0 and 13_2 to 13_9, the address decoder 21 sends the valid signal (Mst.valid) and priority (Mst.priority) of the request packet 41_1 to the arbitration part 32. In addition, an access to the relay circuit 12_1 from the bus master 11_1 is sometimes referred to as a "vertical access" for convenience.

The address decoder 31 is so configured as to be able to receive a valid signal (Adj.valid) contained in a request packet 51_0 sent from the adjacent relay circuit 12_0 (that is, a relay circuit immediately before) and an address (Adj.address). When the address decoder 31 has a valid signal (Adj.valid=1), the address decoder 31 decodes the received address (Adj.address). Then, according to the address so decoded, the address decoder 31 sends the valid signal (Adj.valid) of the request packet 51_0 and priority (Adj.priority) to the arbitration part 22 or the arbitration part 32. For example, when the decoded address indicates a slave 13_1, the address decoder 31 sends the valid signal (Adj.valid) and the priority (Adj.priority) of the request packet 51_0 to the arbitration part 22. On the other hand, when the decoded address indicates one of the slaves 13_2 to 13_9, the address decoder 31 sends the valid signal (Adj.valid) and priority (Adj.priority) of the request packet 51_0 to the arbitration part 32. In addition, an access to the relay circuit 12_1 from the adjacent relay circuit 12_0 is sometimes referred to as a "horizontal access" for convenience.

When the request packets to the slave 13_1 conflict with each other, the arbitration part 22 arbitrates these request packets. Specifically, when the request packet 41_1 of the bus master 11_1 conflict with the request packet 51_0 of the adjacent relay circuit 12_0, the arbitration part 22 arbitrates the request packet 41_1 and the request packet 51_0, and send the request packet after arbitration to the buffer circuit 23. That is, when the valid signal (Mst.valid) supplied from the address decoder 21 and the valid signal (Adj.valid) supplied from the address decoder 31 become valid at the same timing (Mst.valid=1 and Adj.valid=1), the arbitration part 22 arbitrates the request packet 41_1 and the request packet 51_0, and sends the request packet after arbitration to the buffer circuit 23. At this time, the arbitration part 22 arbitrates the request packet 41_1 and the request packet 51_0 with use of the priority of the request packet 41_1 and the priority of the request packet 51_0.

After temporarily holding the request packet outputted from the arbitration part 22, the buffer circuit 23 outputs a request packet 42_1 to the slave 13_1. For example, the buffer circuit 23 is a buffer circuit of a FIFO (First In, First Out) system, and can be configured using a plurality of flip-flop circuits. The flip-flop circuits operate in synchronism with clock signals. Configured as above, the buffer circuit 23 can hold a plurality of request packets temporarily.

When the buffer circuit 23 has vacancy and is capable of receiving the request packet outputted from the arbitration part 22, the buffer circuit 23 sends a signal (referred to as "ready" or "grant") indicating capability of reception as to the arbitrated request packet to the arbitration part 22. On the other hand, when the buffer circuit 23 has no vacancy, the buffer circuit 23 sends a handshaking signal rejecting to accept a next request packet to the arbitration part 22. In this case, handshaking is not established and the reception of a request packet is rejected.

Moreover, when receiving a signal ("ready" or "grant") indicating the capability of reception from the slave 13_1, the buffer circuit 23 sends the request packet held in the buffer circuit 23 to the slave 13_1.

Figure 3:
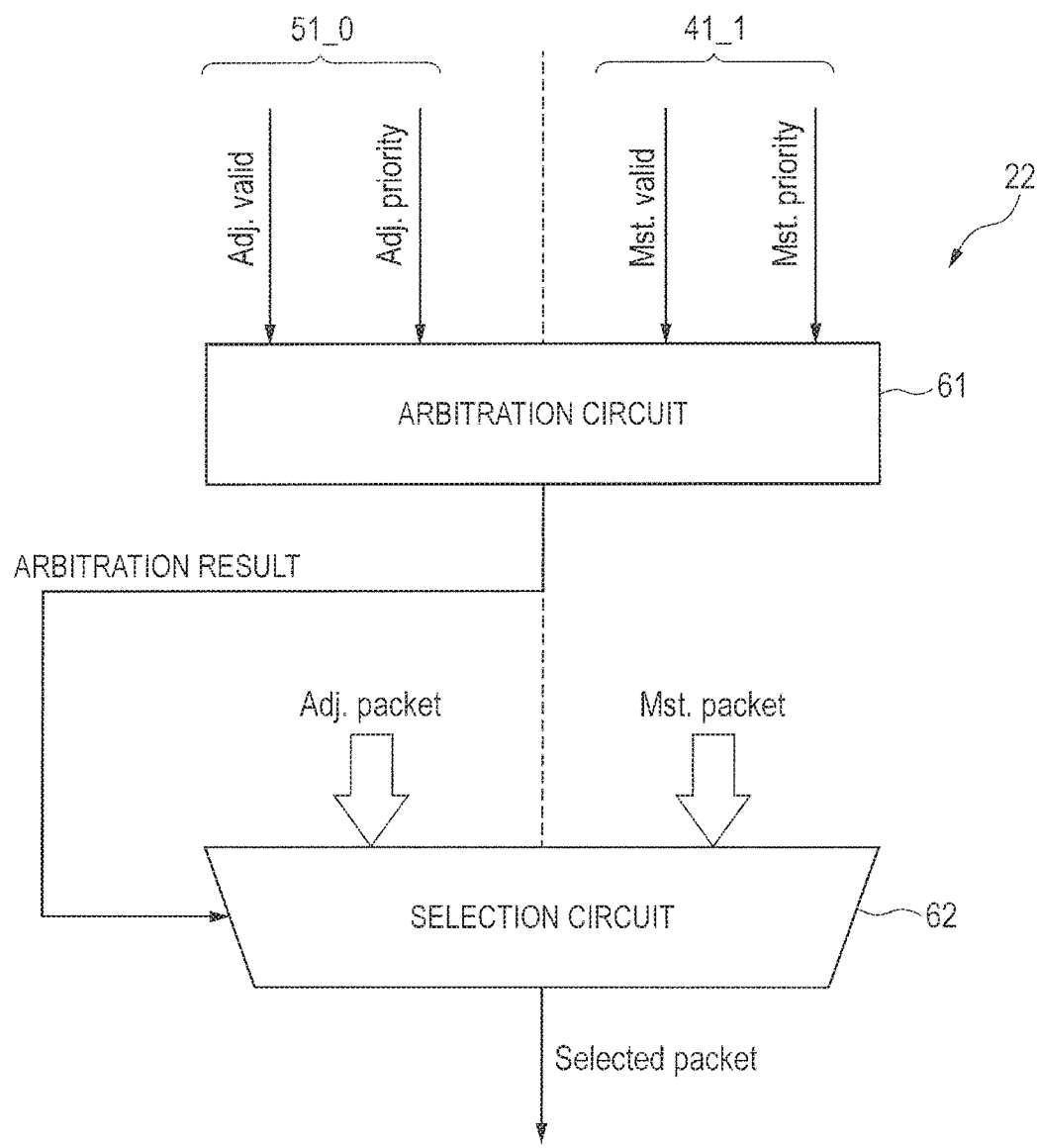
FIG. 3 is a block diagram showing a configuration example of an arbitration part included in the relay circuit.

FIG. 3 is a block diagram showing a configuration example of the arbitration part 22 shown in FIG. 2. As shown in FIG. 3, the arbitration part 22 includes an arbitration circuit 61 and a selection circuit 62. The arbitration circuit 61 is so configured as to be able to receive the valid signal (Mst.valid) and priority (Mst.priority) contained in the request packet 41_1 of the bus master 11_1 from the address decoder 21. Moreover, the arbitration circuit 61 is so configured as to be able to receive the valid signal (Adj.valid) and priority (Adj.priority) contained in the request packet 51_0 of the adjacent relay circuit 12_0 from the address decoder 31.

When the request packet 41_1 of the bus master 11_1 and the request packet 51_0 of the adjacent relay circuit 12_0 conflict with each other, the arbitration circuit 61 arbitrates the request packet 41_1 and the request packet 51_0, and outputs an arbitration result to the selection circuit 62. That is, when the valid signal (Mst.valid) supplied from the address decoder 21 and the valid signal (Adj.valid) supplied from the address decoder 31 become valid at the same timing (Mst.valid=1 and Adj.valid=1), the arbitration circuit 61 arbitrates the request packet 41_1 and the request packet 51_0, and outputs an arbitration result to the selection circuit 62.

At this time, the arbitration circuit 61 arbitrates the request packet 41_1 and the request packet 51_0 with use of the priority (Mst.priority) of the request packet 41_1 and the priority (Adj.priority) of the request packet 51_0. For example, each priority (Mst.priority/Adj.priority) is shown by a numerical value, and it is set such that the greater the value of the priority is, the higher the priority becomes. For example, priority can be set using the value between 0 and 15. In such a case, a request packet whose priority is 15 is a request packet with highest priority.

The arbitration circuit 61 compares the priority (Mst.priority) of the request packet 41_1 with the priority (Adj.priority) of the request packet 51_0, and selects the request packet whose value of priority is greater. Information about the selected request packet is outputted to the selection circuit 62 as an arbitration result. In addition, when the priority (Mst.priority) of the request packet 41_1 and the priority (Adj.priority) of the request packet 51_0 have the same values, with use of an LRU (Least Recently Used) method etc., the arbitration circuit 61 selects one of the two accesses.

The selection circuit 62 receives the request packet (Mst.packet) 41_1 of the bus master 11_1 and the request packet (Adj.packet) 51_0 of the adjacent relay circuit 12_0. Then, according to an arbitration result of the arbitration circuit 61, the selection circuit 62 outputs one of the request packet (Mst.packet) 41_1 and the request packet (Adj.packet) 51_0 as a selected packet. The selected request packet is outputted to the buffer circuit 23 shown in FIG. 2.

When the request packets to the next relay circuit 12_2 conflict with each other, the arbitration part 32 shown in FIG. 2 arbitrates these request packets. Specifically, when the request packet 41_1 of the bus master 11_1 and the request packet 51_0 of the adjacent relay circuit 12_0 conflict with each other, the arbitration part 32 makes the arbitration between the request packet 41_1 and the request packet 51_0, and sends the request packet after arbitration to the buffer circuit 33. That is, when the valid signal (Mst.valid) supplied from the address decoder 21 and the valid signal (Adj.valid) supplied from the address decoder 31 become valid at the same timing (Mst.valid=1 and Adj.valid=1), the arbitration part 32 arbitrates the request packet 41_1 and the request packet 51_0, and sends the request packet after arbitration to the buffer circuit 23. At this time, the arbitration part 22 arbitrates the request packet 41_1 and the request packet 51_0 using the priority of the request packet 41_1 and the priority of the request packet 51_0.

Moreover, the arbitration part 32 includes a priority adjustment circuit which adjusts the priority of the request packet 41_1 according to a destination of the request packet 41_1 of the bus master 11_1. Specifically, the priority adjustment circuit adjusts the priority of the request packet 41_1 according to the number of the relay circuits 12_0 to 12_9 through which the request packet 41_1 of the bus master 11_1 passes before reaching its destination. The detail of the priority adjustment circuit will be described later.

The buffer circuit 33 outputs the request packet 51_1 to a next relay circuit 12_2 after holding temporarily the request packet outputted from the arbitration part 32. For example, the buffer circuit 33 includes a plurality of flip-flop circuits, and the flip-flop circuits operate in synchronism with clock signals. With the above configuration, the buffer circuit 33 can hold the request packets temporarily.

When the buffer circuit 33 has vacancy and is capable of receiving a request packet outputted from the arbitration part 32, the buffer circuit 33 sends a signal (referred to as "ready" or "grant") which shows that it can accept an arbitrated request packet to the arbitration part 32. On the other hand, when the buffer circuit 33 does not have any vacancy, it sends a handshaking signal rejecting to receive a next request packet to the arbitration part 32. In this case, since a handshake is not established, a reception of the request packet is rejected.

Moreover, when receiving the signal ("ready" or "grant") which shows capability of acceptance from a next relay circuit 12_2, the buffer circuit 33 sends the request packet held in the buffer circuit 33 to the next relay circuit 12_2.

Figure 4:
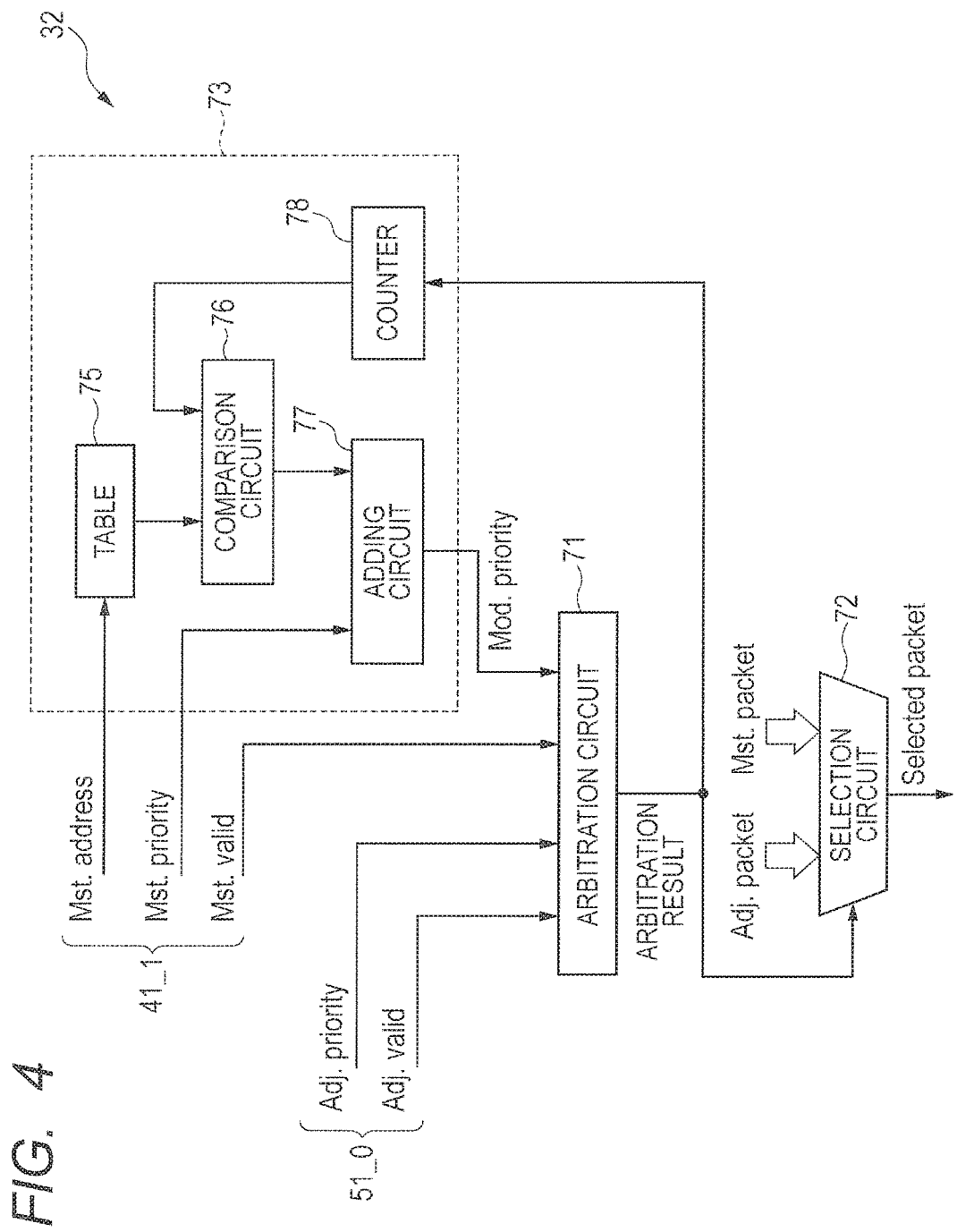
FIG. 4 is a block diagram showing a configuration example of an arbitration part included in the relay circuit.

FIG. 4 is a block diagram showing a configuration example of the arbitration part 32 shown in FIG. 2. As shown in FIG. 4, the arbitration part 32 includes an arbitration circuit 71, a selection circuit 72, and a priority adjustment circuit 73. The arbitration circuit 71 is so configured as to be able to receive a valid signal (Mst.valid) contained in the request packet 41_1 of the bus master 11_1 from an address decoder 21. Moreover, the arbitration circuit 71 is so configured as to be able to receive the priority (Mod.priority) of the request packet 41_1 adjusted in the priority adjustment circuit 73 from the priority adjustment circuit 73. In addition, as the priority (Mod.priority), the priority adjustment circuit 73 outputs the priority (Mst.priority) as it is when the priority (Mst.priority) of the request packet 41_1 is not adjusted. Moreover, the arbitration circuit 71 is so configured as to be able to receive a valid signal (Adj.valid) and priority (Adj.priority) contained in the request packet 51_0 of the adjacent relay circuit 12_0 from the address decoder 31.

When the request packet 41_1 of the bus master 11_1 and the request packet 51_0 of the adjacent relay circuit 12_0 conflict with each other, the arbitration circuit 71 arbitrates the request packet 41_1 and the request packet 51_0, and outputs an arbitration result to the selection circuit 72. That is, when the valid signal (Mst.valid) supplied from the address decoder 21 and the valid signal (Adj.valid) supplied from the address decoder 31 become effective at the same timing (Mst.valid=1 and Adj.valid=1), the arbitration circuit 71 arbitrates the request packet 41_1 and the request packet 51_0, and outputs an arbitration result to the selection circuit 72.

At this time, using priority (Mod.priority) (when not adjusted, priority (Mst.priority)) of the request packet 41_1 adjusted in the priority adjustment circuit 73 and the priority (Adj.priority) of the request packet 51_0, the arbitration circuit 71 arbitrates the request packet 41_1 and the request packet 51_0.

The arbitration circuit 71 compares the priority (Mod.priority) of the request packet 41_1 and the priority (Adj.priority) of the request packet 51_0 supplied from the priority adjustment circuit 73, and selects the request packet with a larger value of priority. The information about the selected request packet is outputted to the selection circuit 72 as an arbitration result.

The selection circuit 72 receives the request packet (Mst.packet) 41_1 of the bus master 11_1 and the request packet (Adj.packet) of the adjacent relay circuit 12_0, and outputs one of the request packet (Mst.packet) 41_1 and the request packet (Adj.packet) as a selected request packet (selected packet) according to the arbitration result of the arbitration circuit 71. The selected request packet is outputted to the buffer circuit 33 shown in FIG. 2.

Next, the priority adjustment circuit 73 will be explained in detail. The priority adjustment circuit 73 adjusts priority of the request packet 41_1 according to the number of the relay circuits 12_0 to 12_9 through which the request packet 41_1 of the bus master 11_1 passes before reaching its destination. Specifically, the priority adjustment circuit 73 so adjusts as to allow the priority (Mst.priority) of the request packet 41_1 of the bus master 11_1 to be higher when the number of times the request packet 41_1 of the bus master 11_1 is rejected in the arbitration circuit 71 exceeds a predetermined value. At this time, the predetermined threshold value is set such that the greater the number of the relay circuits 12_0 to 12_9 through which the request packet 41_1 of the bus master 11_1 passes before reaching its destination is, the smaller the predetermined threshold value is. In addition, when the priority (Mst.priority) of the request packet 41_1 is not adjusted in the priority adjustment circuit 73, the priority adjustment circuit 73 outputs the priority (Mst.priority) to the arbitration circuit 71 as priority (Mod.priority).

As shown in FIG. 4, the priority adjustment circuit 73 includes a table 75, a comparison circuit 76, an adding circuit 77, and a counter 78.

Figure 5:
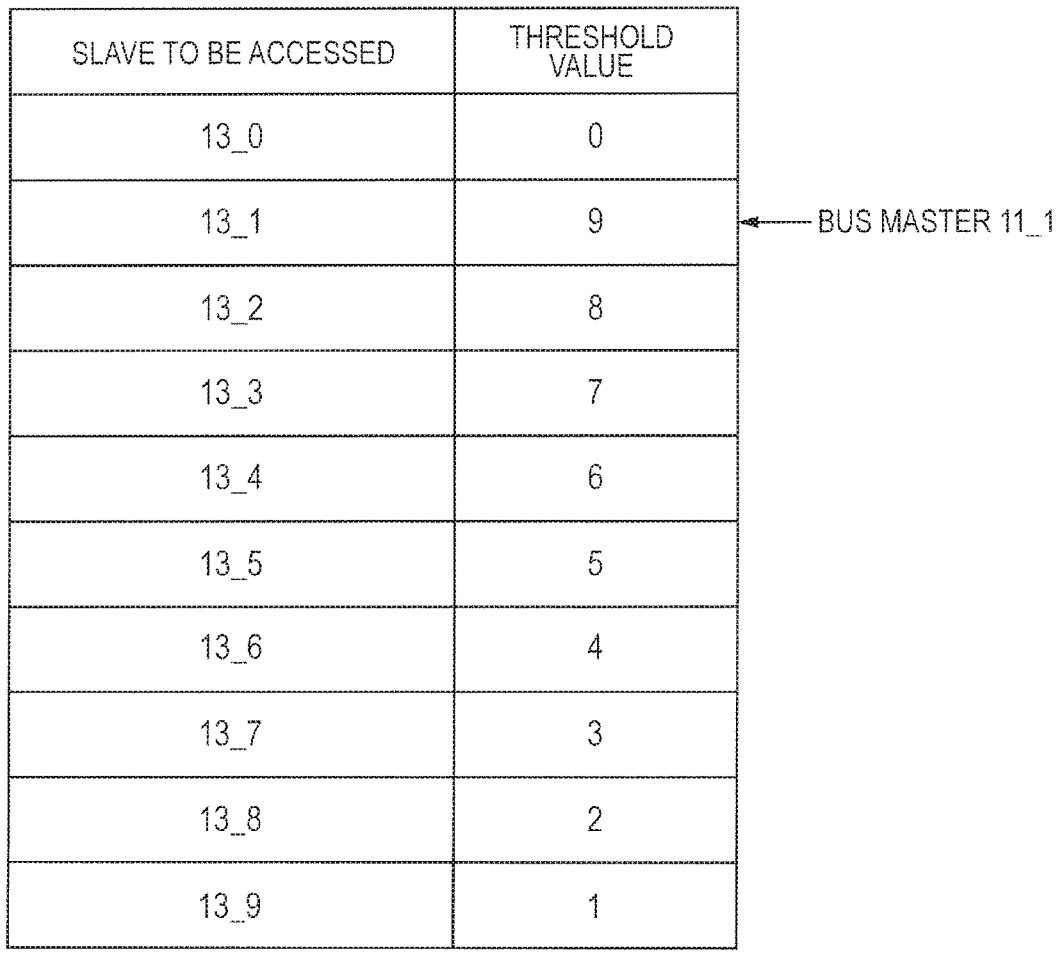
FIG. 5 is a table showing an example of a table included in a priority adjustment circuit.

The table 75 stores the predetermined threshold value. FIG. 5 is a table showing one example of the table 75 included in the priority adjustment circuit, and shows the example of a set up of the predetermined threshold value. FIG. 5 shows one example of the table 75 (lookup table) included in the relay circuit 12_1 and one example of the predetermined threshold value used when adjusting the priority of the request packet 41_1 of the bus master 11_1.

As shown in FIG. 5, a predetermined threshold value is set such that the greater the number of relay circuits through which the request packet 41_1 of the bus master 11_1 passes before reaching its destination (that is, the farther the destination is), the smaller the predetermined threshold value is. For example, when an access destination of the bus master 11_1 is a nearest slave 13_1 from the bus master 11_1, a predetermined threshold value becomes the greatest value "9." Also, when the access destination of the bus master 11_1 is a farthest slave 13_0 from the bus master 11_1 (that is, the slave 13_0 is the farthest since the ring bus 15 transfers data clockwise), a predetermined threshold value becomes the smallest value "0." In addition, when access destinations of the bus master 11_1 are slaves 13_2 to 13_9, the farther the access destination of the bus master 11_1 is (i.e., the greater the number of relay circuits to pass through is), the smaller the predetermined threshold value becomes in due order, such as 8, 7, . . . , 1.

The predetermined threshold value corresponds to a permissive number of times the request packet 41_1 of the bus master 11_1 is rejected (hereafter, also referred to as a "number of defeat times") in the arbitration circuit 71 in FIG. 4. Therefore, when the access destination of the bus master 11_1 is a nearest slave 13_1 from the bus master 11_1, since the access destination is the nearest, it is permissive that the request packet 41_1 is rejected the greatest number of times. On the other hand, when the access destination of the bus master 11_1 is the farthest slave 13_0 from the bus master 11_1, since the access destination is the farthest, the permissive number of defeat times of the request packet 41_1 of the bus master becomes the smallest. That is, by setting the predetermined threshold value in this way, a request packet with a distant access destination can be preferentially put into the ring bus 15.

When an address (Mst.address) (corresponding to an address of a slave of an access destination) showing an access destination of the request packet 41_1 of the bus master 11_1 is supplied, the table 75 outputs a predetermined threshold value corresponding to the address (Mst.address) to the comparison circuit 76. In addition, the predetermined threshold value stored in the table can be set arbitrarily. For example, the configuration may be such that the table 75 includes a resistor and a predetermined threshold value stored in the resistor may be rewritten by using a CPU etc.

An arbitration result of the arbitration circuit 71 is supplied to a counter 78. The counter 78 counts the number of times (number of defeat times) the request packet 41_1 of the bus master 11_1 is rejected in the arbitration circuit 71, and outputs the count value to the comparison circuit 76.

The comparison circuit 76 compares the count value (that is, the number of times the request packet 41_1 of the bus master 11_1 is rejected (number of defeat times)) supplied from the counter 78 with the predetermined threshold value supplied from the table 75, and outputs a comparison result to the adding circuit 77.

When the number of times (number of defeat times) the request packet 41_1 of the bus master 11_1 is rejected exceeds the predetermined threshold value, the comparison circuit 76 outputs an addition enable signal to the adding circuit 72 as a comparison result. When the addition enable signal is supplied, the adding circuit 77 adds a predetermined value to the priority (Mst.priority) of the request packet 41_1 to adjust the priority, and outputs the adjusted priority (Mod.priority) to the arbitration circuit 71.

On the other hand, when the number of times (number of defeat times) the request packet 41_1 of the bus master 11_1 is rejected is below the predetermined threshold value, the adding circuit 77 outputs an addition disable signal to the adding circuit 77 as a comparison result. When the addition disable signal is supplied, the adding circuit 77 outputs the priority (Mst.priority) as the priority (Mod.priority), without adding the predetermined value to the priority (Mst.priority) of the request packet 41_1, to the arbitration circuit 71.

In the data processor 1 according to the present embodiment here, the value of the priority is set as a numeric value within a predetermined range. A user can determine arbitrarily the predetermined value added in the adding circuit 77. For example, the predetermined value added in the adding circuit 77 is stored in the resistor (not shown) included in the adding circuit 77, and the user can change the predetermined value to be added by rewriting the value stored in the resistor.

Moreover, when adding the predetermined value to the priority, the adding circuit 77 adds so that the value may not exceed an upper limit of the set range of the priority. For example, when the priority of the data processor 1 is set between the values 0 and 15, the adding circuit 77 adjusts so that the value of the adjusted priority (Mod.priority) may not exceed "15." That is, the adding circuit 77 can be configured as an adding circuit with a function of saturation processing.

The arbitration circuit 71 compares the priority (Mod.priority) of the request packet 41_1 adjusted in the priority adjustment circuit 73 with the priority (Adj.priority) of the request packet 51_0, and outputs an arbitration result to the selection circuit 72 and the counter 78. When the request packet 41_1 of the bus master 11_1 is rejected in the arbitration circuit 71, the counter 78 adds "1" to a current number of defeat times. The number of added defeat times, i.e., the count value of the counter 78, is outputted to the comparator 76.

Figure 7:
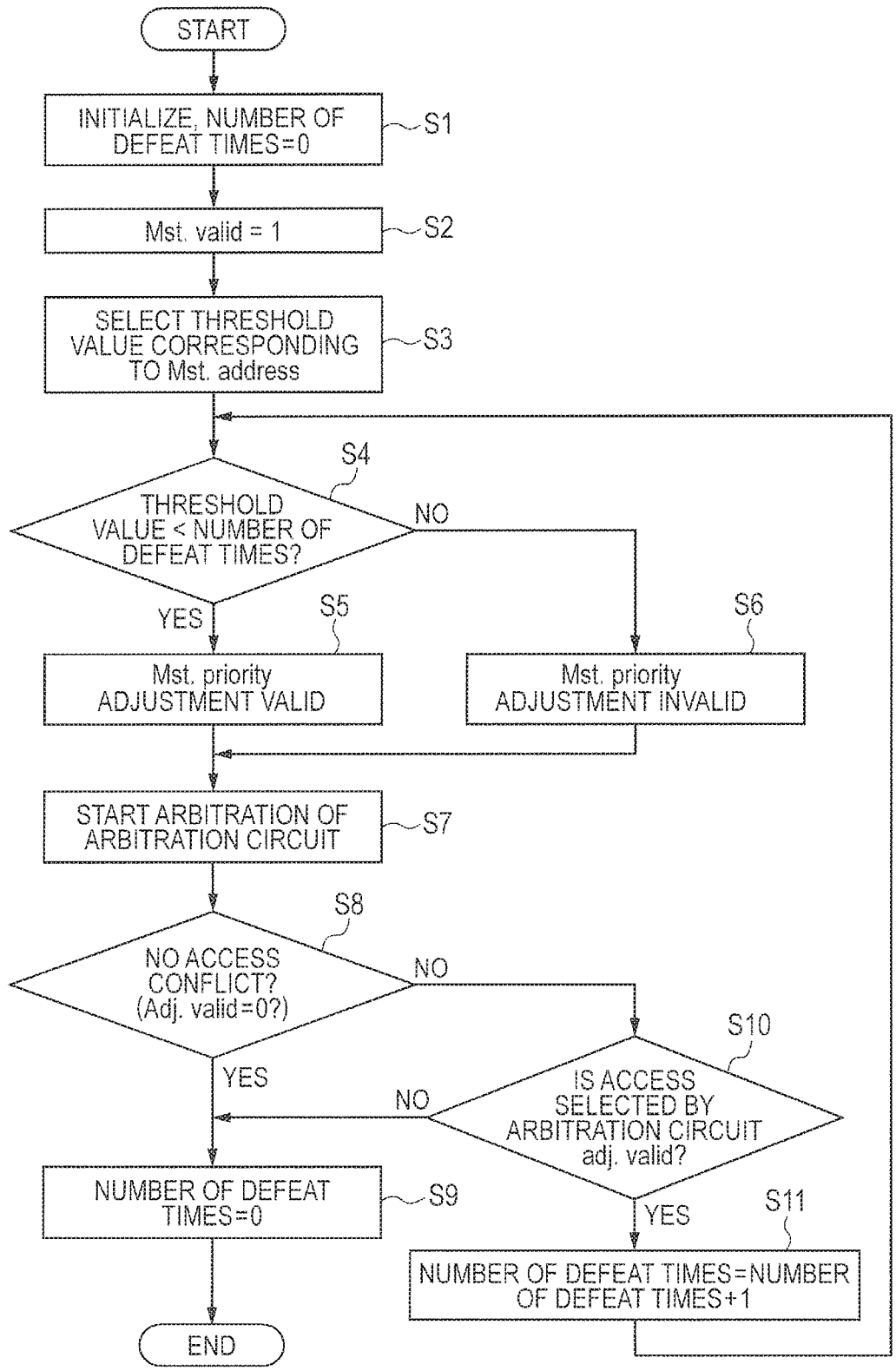
FIG. 7 is a flowchart for explaining an operation of the data processor according to Embodiment 1.

Next, with reference to a flowchart shown in FIG. 7, an operation of the priority adjustment circuit 73 will be explained. In the operation of the priority adjustment circuit 73 described below, a case where the bus master 11_1 sends the request packet 41_1 to a slave 13_3 will be explained as an example. In this regard, the priority of each request packet is set between "0" and "15." Further, the priority (Mst.priority) of the request packet 41_1 of the bus master 11_1 is "10." Still further, the value which the adding circuit 77 adds at a time is set to "2." Still further, the priority (Adj.priority) of the request packet 51_0 of the adjacent relay circuit 12_0 is set to "11." In addition, the priority (Adj.priority) of the request packet 51_0 of the adjacent relay circuit 12_0 varies according to the request packet 51_0 which the arbitration circuit 71 receives. However, in the explanations below, for the sake of simplicity, the priority (Adj.priority) of the request packet 51_0 is fixed to "11."

First, the priority adjustment circuit 73 shown in FIG. 4 is initialized (step S1). At this time, the count value (i.e., the number of defeat times) of the counter 78 is set to "0."

Subsequently, when the request packet 41_1 is sent to the relay circuit 12_1 from the bus master 11_1, a valid signal (Mst.valid) contained in the request packet 41_1 becomes valid "1" (step S2). The table 75 outputs a threshold value corresponding to an address (Mst.address) contained in the request packet 41_1 to the comparison circuit 76 (step S3). In this case, since a destination of the request packet 41_1 is the slave 13_3, the address (Mst.address) becomes "7" (refer to FIG. 5).

Subsequently, the comparison circuit 76 compares the count value (number of defeat times) of the counter 78 with the threshold value supplied from the table 75 (step S4). In this case, since the threshold value supplied from the table 75 is "7" and the number of defeat times is "0," which does not satisfy "threshold value<number of defeat times" (step S4: No). Therefore, as a comparison result, the comparison circuit 76 outputs an addition disable signal to the adding circuit 77. When the addition disable signal is supplied, without adding a predetermined value to the priority (Mst.priority) of the request packet 41_1, the comparison circuit 77 outputs the priority (Mst.priority) as priority (Mod.priority) to the arbitration circuit 71 (step S6).

Next, the arbitration circuit 71 starts arbitration of the request packet 41_1 (step S7). When the request packet which the arbitration circuit 71 has received is the request packet 41_1 alone, the valid signal (Mst.valid) alone of the request packet 41_1 becomes valid, and the valid signal (Adj.valid) of the request packet 51_0 of the adjacent relay circuit 12_0 becomes invalid "0" (step S8: Yes).

Since there are no conflicting requests in this case, the arbitration circuit 71 selects the request packet 41_1. The information about the selected request packet is outputted to the selection circuit 72 as an arbitration result. The selection circuit 72 outputs the request packet (Mst.packet) 41_1 of the bus master 11_1 as a selected request packet (selected packet).

Moreover, the priority adjustment circuit 73 resets the count value (number of defeat times) of the counter 78 to 0 (step S9).

On the other hand, the request packets which the arbitration circuit 71 has received are the request packet 41_1 of the bus master 11_1 and the request packet 51_0 of the adjacent relay circuit 12_0, in addition to the valid signal (Mst.valid) of the request packet 41_1, the valid signal (Adj.valid) of the request packet 51_0 of the adjacent relay circuit 12_0 also becomes valid (step S8: No). In this case, since the request packet 41_1 and the request packet 51_0 conflict with each other, the arbitration circuit 71 arbitrates the request packet 41_1 and the request packet 51_0 using the priority (Mod.priority) of the request packet 41_1 and the priority (Adj.priority) of the request packet 51_0 outputted from the priority adjustment circuit 73.

At this time, the priority (Mod.priority) of the request packet 41_1 is "10" (the same as the priority (Mst.priority)) and the priority (Adj.priority) of the request packet 51_0 is "11." Therefore, the arbitration circuit 71 selects the request packet 51_0 of the adjacent relay circuit 12_0 (step S10: Yes). This arbitration result is outputted to the selection circuit 72 and the counter 78.

When the request packet 41_1 of the bus master 11_1 is rejected in the arbitration circuit 71, the counter 78 adds "1" to the current number of defeat times (step S11). In this case, the count value (number of defeat times) of the counter is "1."

After that, the comparison circuit 76 returns to step S4, and again compares the count value (number of defeat times) of the counter 78 with the threshold value supplied from the table 75. In this case, the threshold value supplied from the table 75 is "7" and the number of defeat times is "1," which does not satisfy "threshold value<number of defeat times" (step S4: No). Therefore, the comparison circuit 76 outputs an addition disable signal to the adding circuit 77 as a comparison result. When the addition disable signal is supplied, without adding a predetermined value to the priority (Mst.priority) of the request packet 41_1, the adding circuit 77 outputs the priority (Mst.priority) as the priority (Mod.priority) to the arbitration circuit 71 (step S6).

Next, the arbitration circuit 71 starts arbitration of the request packet 41_1 (step S7). When the request packets which the arbitration circuit 71 has received are the request packet 41_1 of the bus master 11_1 and the request packet 51_0 of the adjacent relay circuit 12_0, in addition to the valid signal (Mst.valid) of the request packet 41_1, the valid signal (Adj.valid) of the request packet 51_0 of the adjacent relay circuit 12_0 also becomes valid (step S8: No). In this case, the request packet 41_1 and the request packet 51_0 conflict with each other. Therefore, the arbitration circuit 71 arbitrates the request packet 41_1 and the request packet 51_0 using the priority (Mod.priority) of the request packet 41_1 and the priority (Adj.priority) of the request packet 51_0 outputted from the priority adjustment circuit 73.

At this time, the priority (Mod.priority) of the request packet 41_1 is "10" (the same as the priority (Mst.priority)). Since the priority (Adj.priority) of the request packet 51_0 is "11," the arbitration circuit 71 selects the request packet 51_0 of the adjacent relay circuit 12_0 (step S10: Yes). This arbitration result is outputted to the selection circuit 72 and the counter 78.

The counter 78 adds "1" to the current number of defeat times when the request packet 41_1 of the bus master 11_1 is rejected in the arbitration circuit 71 (step S11). In this case, the count value (number of defeat times) of the counter is "2."

In step S11, such an operation is continued until the count value (number of defeat times) of the counter 78 becomes "8." That is, in step S11, when the count value (number of defeat times) of the counter 78 becomes "8," the count value (number of defeat times) "8" of the counter 78 becomes greater than the threshold value "7" supplied from the table 75. In this case, in step S4, since "threshold value<number of defeat times" is satisfied (step S4: Yes), the comparison circuit 76 outputs an addition enable signal to the adding circuit 77 as a comparison result.

When the addition enable signal is supplied, the adding circuit 77 adds a predetermined value "2" to the priority (Mst.priority) of the request packet 41_1, and outputs the priority after addition as the priority (Mod.priority) to the arbitration circuit 71 (step S5).

Next, the arbitration circuit 71 starts arbitration of the request packet 41_1 (step S7). When the request packets which the arbitration circuit 71 has received are the request packet 41_1 of the bus master 11_1 and the request packet 51_0 of the adjacent relay circuit 12_0, in addition to the valid signal (Mst.valid) of the request packet 41_1, the valid signal (Adj.valid) of the request packet 51_0 of the adjacent relay circuit 12_0 also becomes valid (step S8: No). In this case, since the request packet 41_1 and the request packet 51_0 conflict with each other, the arbitration circuit 71 arbitrates the request packet 41_1 and the request packet 51_0 with use of the priority (Mod.priority) of the request packet 41_1 and the priority (Adj.priority) of the request packet 51_0 outputted from the priority adjustment circuit 73.

Since the priority (Mod.priority) of the request packet 41_1 is "12" and the priority (Adj.priority) of the request packet 51_0 is "11" at this time, the arbitration circuit 71 selects the request packet 41_1 of the bus master 11_1 (step S10: No). This arbitration result is outputted to the selection circuit 72 and the counter 78. The selection circuit 72 outputs the request packet (Mst.packet) 41_1 of the bus master 11_1 as a selected request packet (selected packet).

Moreover, the priority adjustment circuit 73 resets the count value (number of defeat times) of the counter 78 to "0" (step S9).

According to the operation described above, the priority adjustment circuit 73 can adjust the priority of the request packet 41_1 according to the number of relay circuits 12_0 to 12_9 through which the request packet 41_1 of the bus master 11_1 passes before reaching its destination. Specifically, the priority adjustment circuit 73 can so adjust as to allow the priority (Mst.priority) of the request packet 41_1 of the bus master 11_1 to be higher when the number of times the request packet 41_1 of the bus master 11_1 is rejected in the arbitration circuit 71 exceeds the predetermined threshold value. As described above, the predetermined threshold value is set such that the greater the number of the relay circuits 12_0 to 12_9 through which the request packet 41_1 of the bus master 11_1 passes before reaching its destination is, the smaller the predetermined threshold value is.

In the above example, in step S5, the explanation has been given to the case where the priority (Mod.priority) of the request packet 41_1 is selected in the arbitration circuit 71 immediately after the predetermined value is added to the priority (Mst.priority) of the request packet 41_1 by the adding circuit 77. However, depending on the priority (Adj.priority) of the request packet 51_0 conflicting with the request packet 41_1, even if a predetermined value is added to the priority (Mst.priority) of the request packet 41_1, the request packet 41_1 may not be selected (may defeated).

In such a case, in the adding circuit 77, a predetermined value may further be added. For example, when addition is made twice in the adding circuit 77, the priority (Mod.priority) of the request packet 41_1 after adjustment becomes "14 (=10+2+2)."

Also, instead of further adding the predetermined value in the adding circuit 77, the arbitration in the arbitration circuit 71 may be repeated until the priority (Adj.priority) of the conflicting request packet 51_0 is reduced.

Moreover, when the request packet 41_1 is not selected after a predetermined value is added to the priority (Mst.priority) of the request packet 41_1, the request packet 41_1 may be arbitrated as follows. That is, when the priority of the request packet 41_1 is high and the request packet 41_1 is not desired to be stagnant (i.e., the request packet 41_1 is desired to be preferentially put into the ring bus 15), the priority after addition may be made maximum (15) in the next arbitration.

As described in the background art section, when the ring-type bus topology is used for coupling the bus masters with the slaves, the wiring concentration can be eased more than when the star-type bus topology is used.

However, the case where the ring-type bus topology is used for coupling the bus masters with the slaves causes more variation in latency of the bus access than the case where the star-type bus topology is used. That is, the use of the ring bus causes variation in distance of the ring bus that each bus master travels when making an access to each slave, thereby causing variation in latency of the bus access.

On the other hand, the data processor 1 of the present embodiment is provided with the priority adjustment circuit which adjusts the priority of the request packet of the bus master according to the number of the relay circuits through which the request packet of the bus master passes before reaching its destination. As a result, it becomes possible to provide the data processor capable of suppressing variation in latency of the bus access and the method of controlling the data processor.

That is, adjustment is made in the data processor 1 of the present embodiment such that, when the number of times the request packet of the bus master is rejected in the arbitration circuit exceeds the predetermined threshold value, the priority of the request packet of the bus master may become high. In this regard, the predetermined threshold value is set such that the greater the number of relay circuits through which the request packet of the bus master passes before reaching its destination is, the smaller the predetermined threshold value becomes. In other words, the predetermined threshold value is set such that the farther the destination of the request packet of the bus master is, the smaller the threshold value becomes.

This predetermined threshold value corresponds to the permissible number of times the request packet of the bus master is rejected (number of defeat times). Therefore, when the access destination of the bus master is a slave close to the bus master (i.e., few relay circuits to pass through), since the access destination is close, it is permissible that the request packet of the bus master is rejected many times. On the other hand, when the access destination of the bus master is a slave far from the bus master (i.e., many relay circuits to pass through), since the access destination is far, the permissive number of defeat times of the request packet of the bus master becomes small. That is, by setting the predetermined threshold value in this way, it becomes possible to preferentially put, in a ring bus, a request packet having a distant access destination (many relay circuits to pass through). Further, it becomes possible to raise likelihood that the request packet having the distant access destination occupies a zone in the ring bus. Consequently, it becomes possible to provide the data processor capable of suppressing variation in latency of the bus access and the method for controlling the data processor.

For example, when a circuit having a bus master is configured such that a process is started by leading data held in a slave, the circuit having the bus master will be in a standby state until it receives the lead data. For example, when priority is given to the request of the bus master whose number of steps (corresponding to the number of relay circuits to pass through) in the ring bus is small, or when the priority of the requests of all the bus masters are equivalent, the ratio of the standby time of the request of the bus master having a greater number of steps becomes higher than that of the bus master having a smaller number of steps. In this case, when the bus master having a small number of steps has finished its process, the process of the bus master having a larger number of steps starting late is not completed yet, and the bus master having a larger number of steps must continue its operation.

In a system where a final result is obtained by all the processes of the bus masters being completed, performance variation in the bus masters may cause final performance degradation. In the data processor according to the present embodiment, it becomes possible to uniform balance in the performance of the bus masters and to suppress deterioration in the processing performance of the whole data processor. Moreover, when there is a process that a user intends to finish early, adjustment can be made by changing setting of the bus master.

In the above description, the case where the arbitration part 32 shown in FIG. 4 is applied to the arbitration part 32 shown in FIG. 2. However, in the data processor according to the present embodiment, the arbitration part shown in FIG. 4 may be applied to the arbitration part 22 shown in FIG. 2. That is, even when the bus master makes access to the nearest slave, the technology according to the present embodiment can be applied.

Embodiment 2

Figure 8:
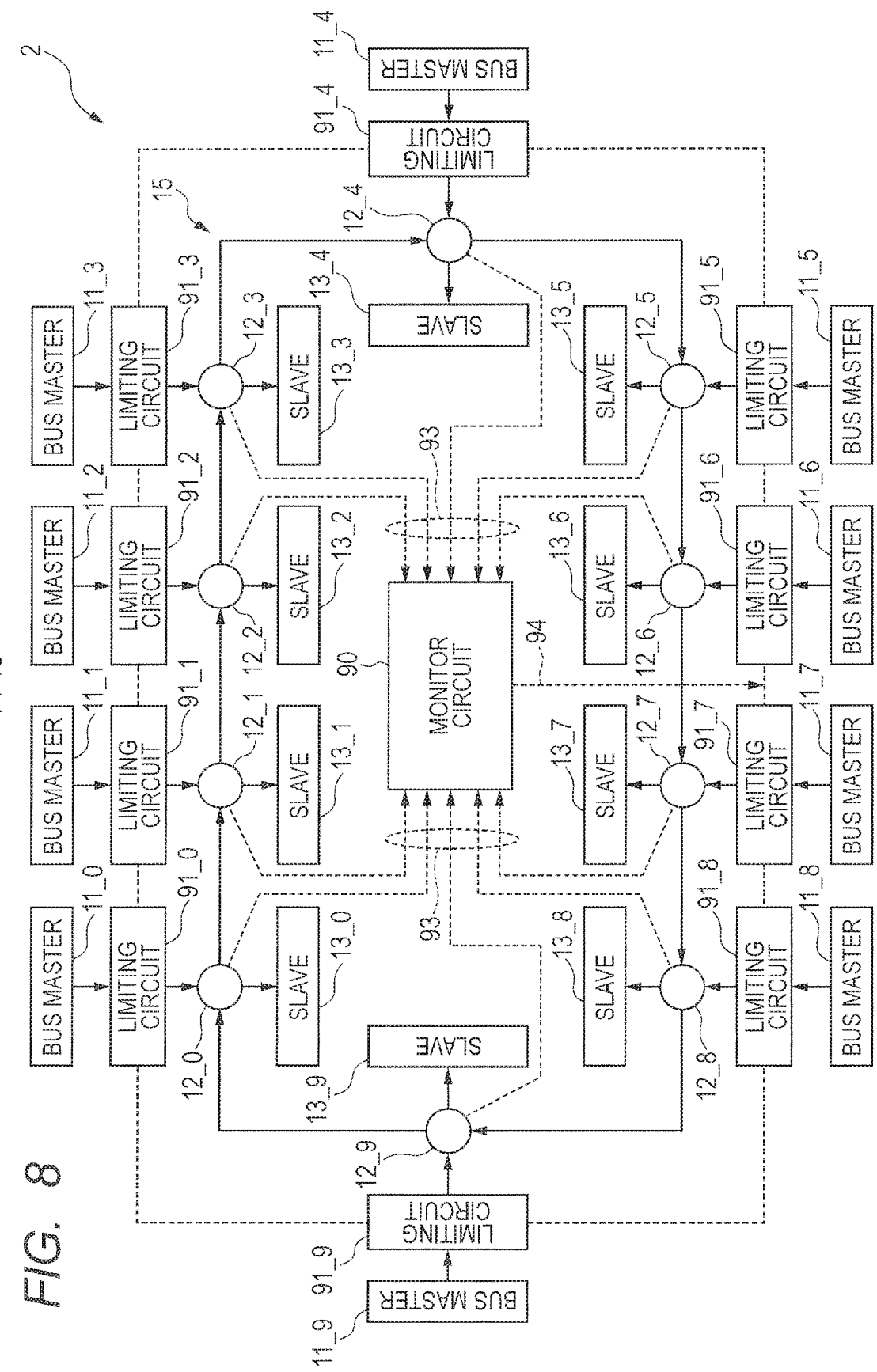
FIG. 8 is a block diagram showing a configuration example of a data processor according to Embodiment 2.

Next, Embodiment 2 will be explained. FIG. 8 is a block diagram showing a configuration example of a data processor according to Embodiment 2. The data processor 2 shown in FIG. 8 differs from the data processor (refer to FIG. 1) explained in Embodiment 1 in that the data processor 2 includes a monitor circuit 90 and limiting circuits 91_0 to 91_9. Since the other parts of the configuration and the operation are the same as those of the data processor 1 in Embodiment 1, the same symbols are attached to components that are the same, and the description thereof is omitted.

As shown in FIG. 8, the data processor 2 includes: a plurality of bus masters 11_0 to 11_9; a plurality of relay circuits 12_0 to 12_9; a plurality of slaves 13_0 to 13_9; a monitor circuit 90; and a plurality of limiting circuits 91_0 to 91_9.

The monitor circuit 90 monitors the amount of request packets in the ring bus 15. Specifically, each of the relay circuits 12_0 to 12_9 supplies information 93 about the amount of the request packets which each of the relay circuits 12_0 to 12_9 holds to the monitor circuit 90. Based on the information 93 supplied by each of the relay circuits 12_0 to 12_9, the monitor circuit 90 grasps the amount of request packets held in each of the relay circuit 12_0 to 12_9, and monitors the amount of request packets in the ring bus 15.

For example, the monitor circuit 90 can monitor the amount of request packets in the ring bus 15 by monitoring the amount of request packets held in the buffer circuit 33 shown in FIG. 2. For example, when the request packets are given from the relay circuit 12_1 to a next relay circuit 12_2, unless the receiving relay circuit 12_2 is ready to receive, request packets remain held (in a stand-by state) in the buffer circuit 33 of the relay circuit 12_1. Therefore, the monitor circuit 90 can monitor the amount of request packets of the whole ring bus 15 by grasping the amount of request packets in a stand-by state in the buffer circuit 33 in each of the relay circuits 12_0 to 12_9.

Each of the limiting circuits 91_0 to 91_9 is provided between each the bus masters 11_0 to 11_9 and each of the relay circuits 12_0 to 12_9. Each of the limiting circuits 91_0 to 91_9 has a function to limit the access to each of the relay circuits 12_0 to 12_9 from each of the bus masters 11_0 to 11_9. Specifically, each of the limiting circuits 91_0 to 91_9 has a function to reject request packets of the bus masters 11_0 to 11_9 being sent to the relay circuits 12_0 to 12_9. For example, the limiting circuits 91_0 to 91_9 can reject the request packets being sent to the relay circuits 12_0 to 12_9 by disabling the valid signals (Mst.valid=0) of the request packets of the bus masters 11_0 to 11_9.

A control signal 94 is supplied to each of the limiting circuits 91_0 to 91_9 from the monitor circuit 90. Each of the limiting circuits 91_0 to 91_9 limits access to each of the relay circuits 12_0 to 12_9 from each of the bus masters 11_0 to 11_9 according to the control signal 94. Specifically, the monitor circuit 90 controls each of the limiting circuits 91_0 to 91_9 according to the amount of request packets in the ring bus 15, and limits the request packets supplied to the relay circuit 12_0 to 12_9 from the bus masters 11_0 to 11_9.

For example, when there is no vacancy in at least one of the buffer circuits 33 of the relay circuits 12_0 to 12_9, the monitor circuit 90 may limit request packets supplied to the relay circuits 12_0 to 12_9 from the bus masters 11_0 to 11_9. Further, a criterion for the monitor circuit 90 to limit requests of the bus master can be determined arbitrarily by a user.

Moreover, when limiting access, each of the limiting circuits 91_0 to 91_9 may limit access of all the bus masters 11_0 to 11_9, or limit access of a particular bus master. For example, each of the limiting circuits 91_0 to 91_9 may limit the access of the bus master to a relay circuit, of the relay circuits 12_0 to 12_9, whose buffer circuit 33 has no vacancy.

Thus, the data processor 2 of the present embodiment monitors the amount of request packets in the ring bus 15 with use of the monitor circuit 90 and, according to the monitored result, the limiting circuit limits new request packets being sent to the relay circuits 12_0 to 12_9 from the bus masters 11_0 to 11_9. As a result, the amount of request packets in the ring bus 15 can be limited, preventing fluidity in the ring bus 15 from being lost. In other words, it becomes possible to suppress the request packets being stagnant in the ring bus 15. Consequently, it becomes possible to preferentially allow the request packets with truly high priority to pass in the ring bus 15.

In the data processor according to Embodiment 1, request packets with high priority can be preferentially put into the ring bus by adjusting the priority of the request packet in consideration of the number of relay circuits (that is, a distance to a slave to which the bus master makes an access) through which the request packet passes. However, even if the request packets with high priority have been put into the ring bus preferentially, when the request packets are stagnant in the relay circuit ahead of them, the effect of the request packets being put into the ring bus is reduced. In the data processor 2 according to the present embodiment, occurrence of the request packets being stagnant in the buffer circuit in the ring bus is suppressed in advance. In this way, it becomes possible to suppress the reduction of the effect obtained in the data processor of Embodiment 1 by adjusting the priority to put the request packets preferentially into the ring bus.

Embodiment 3

Next, Embodiment 3 will be explained. A data processor of Embodiment 3 differs from the data processors 1 and 2 of Embodiments 1 and 2 in that a buffer circuit of the relay circuit is configured differently. Since the other parts of the configuration and the operation are the same as those of the data processors 1 and 2 explained in Embodiments 1 and 2, the same symbols are attached to components that are the same and the description thereof is omitted.

Figure 9:
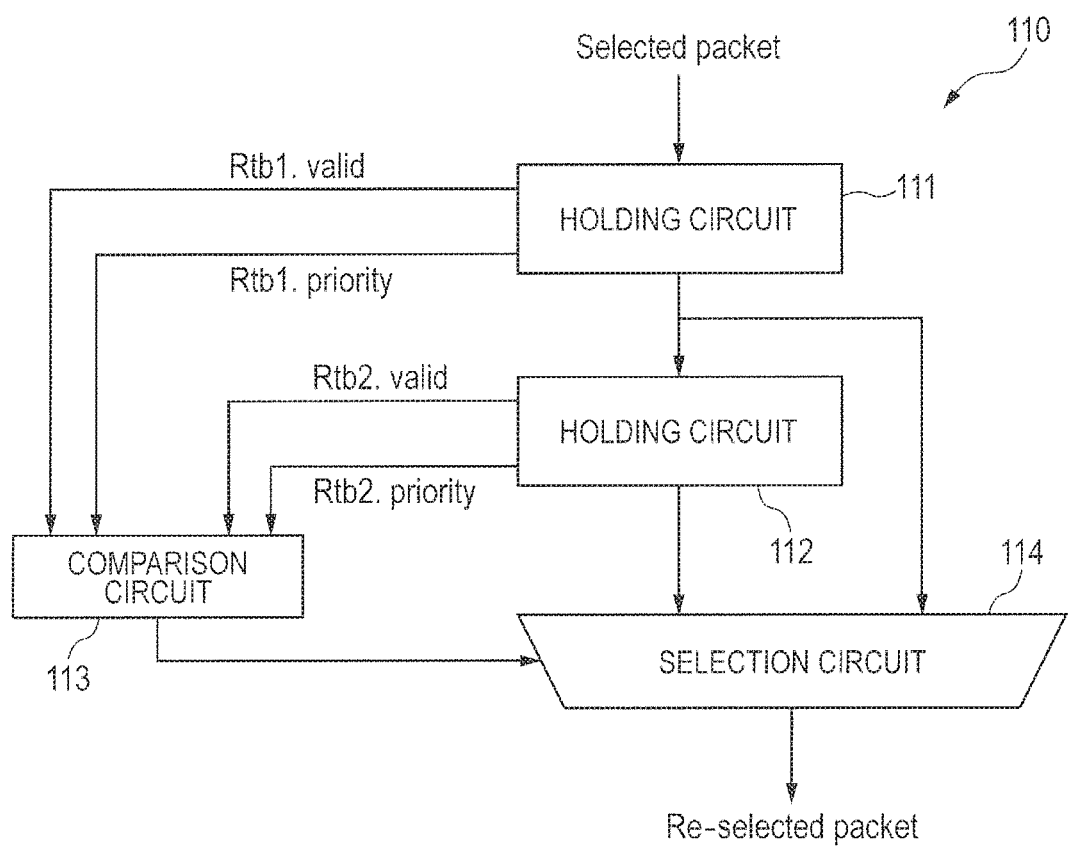
FIG. 9 is a block diagram showing a configuration example of a buffer circuit included in the data processor according to Embodiment 3.

FIG. 9 is a block diagram showing a configuration example of a buffer circuit included in the data processor according to the present embodiment. A buffer circuit 110 shown in FIG. 9 corresponds to the buffer circuits 23 and 33 shown in FIG. 2. Further, one of the two buffer circuits 23 and 33 shown in FIG. 2 alone may be implemented by the buffer circuit 110 shown in FIG. 9. When the fluidity of the ring bus 15 is taken into consideration, it is preferable that at least the buffer circuit 33 shown in FIG. 2 is implemented by the buffer circuit 110 shown in FIG. 9.

The buffer circuit 110 shown in FIG. 9 is configured such that, according to the priority of the request packets, the order of the request packets to be outputted to a next destination (a relay circuit or a slave) can be changed.

As shown in FIG. 9, the buffer circuit 110 includes: holding circuits 111 and 112; a comparison circuit 113; and a selection circuit 114.

The holding circuit 111 is so configured as to be able to hold request packets (selected packets). The holding circuit 112 is provided immediately after the holding circuit 111 and is so configured as to be able to temporarily hold the request packets sent from the holding circuit 111. The holding circuits 111 and 112 may include flip-flop circuits, respectively, which operate in synchronism with clock signals.

The comparison circuit 113 compares the priority of the request packet held in the holding circuit 111 with the priority of the request packet held in the holding circuit 112, and outputs a comparison result to the selection circuit 114.

The selection circuit 114 selects and outputs one of the request packet held in the holding circuit 111 and the request packet held in the holding circuit 112 according to the comparison result supplied from the comparison circuit 113. At this time, the selection circuit 114 selects and outputs the request packet with higher priority out of the request packets held in the holding circuit 111 and the request packet held in the holding circuit 112.

Next, a specific operation of the buffer circuit 110 will be explained. When the request packet is held only in the holding circuit 111, only a valid signal (Rtb1.valid) supplied to the comparison circuit 113 from the holding circuit 111 becomes valid. In this case, the comparison circuit 113 outputs a selection signal which enables the selection of the request packet held in the holding circuit 111 to the selection circuit 114. Subsequently, the selection circuit 114 outputs the request packet held in the holding circuit 111.

Further, in a state where the request packet is held only in the holding circuit 111, when the next destination of the buffer circuit 110 cannot accept the request packet and a request packet is newly supplied to the buffer circuit 110, the request packet held in the holding circuit 111 moves to the holding circuit 112, and a request packet is newly held in the holding circuit 111.

Still further, when request packets are held in the holding circuits 111 and 112, valid signals (Rtb1.valid, Rtb2.valid) supplied to the comparison circuit 113 from the holding circuits 111 and 112 becomes valid. In this case, the comparison circuit 113 compares priority (Rtb1.priority) of the request packet held in the holding circuit 111 with priority (Rtb2.priority) of the request packet held in the holding circuit 112, and outputs a selection signal which enables the selection of the request packet with higher priority to the selection circuit 114.

The selection circuit 114 selects and outputs the request packet with higher priority out of the request packet held in the holding circuit 111 and the request packet held in the holding circuit 112. For example, when the priority of the request packet held in the holding circuit 111 (Rtb1.priority) is higher than the priority (Rtb2.priority) of the request packet held in the holding circuit 112, the selection circuit 114 selects and outputs the request packet held in the holding circuit 111. As a result, the request packet held in the holding circuit 111 can overtake the request packet held in the holding circuit 112.

The buffer circuit 110 included in the data processor of the present embodiment is so configured as to be able to reorder request packets to be outputted to a next destination (a relay circuit or a slave) according to priority of the request packets. As a result, it becomes possible to preferentially transfer the bus packet with high priority. Such a function is particularly effective in a case where the zone inside the ring bus 15 increased or a case where a particular slave is temporarily unable to accept the access and stagnant request packets appear locally, etc.

For example, as in the data processor according to Embodiment 1, even when the threshold value (refer to FIG. 5) is determined according to the number of relay circuits through which the request packet passes and the priority is adjusted, there is a case where request packet are stagnant in the buffer circuit. In such a case, by reordering the request packets to be outputted according to the priority in the buffer circuit (reorder), it becomes possible to effectively suppress variation in latency of the bus access.

Embodiment 4

Figure 10:
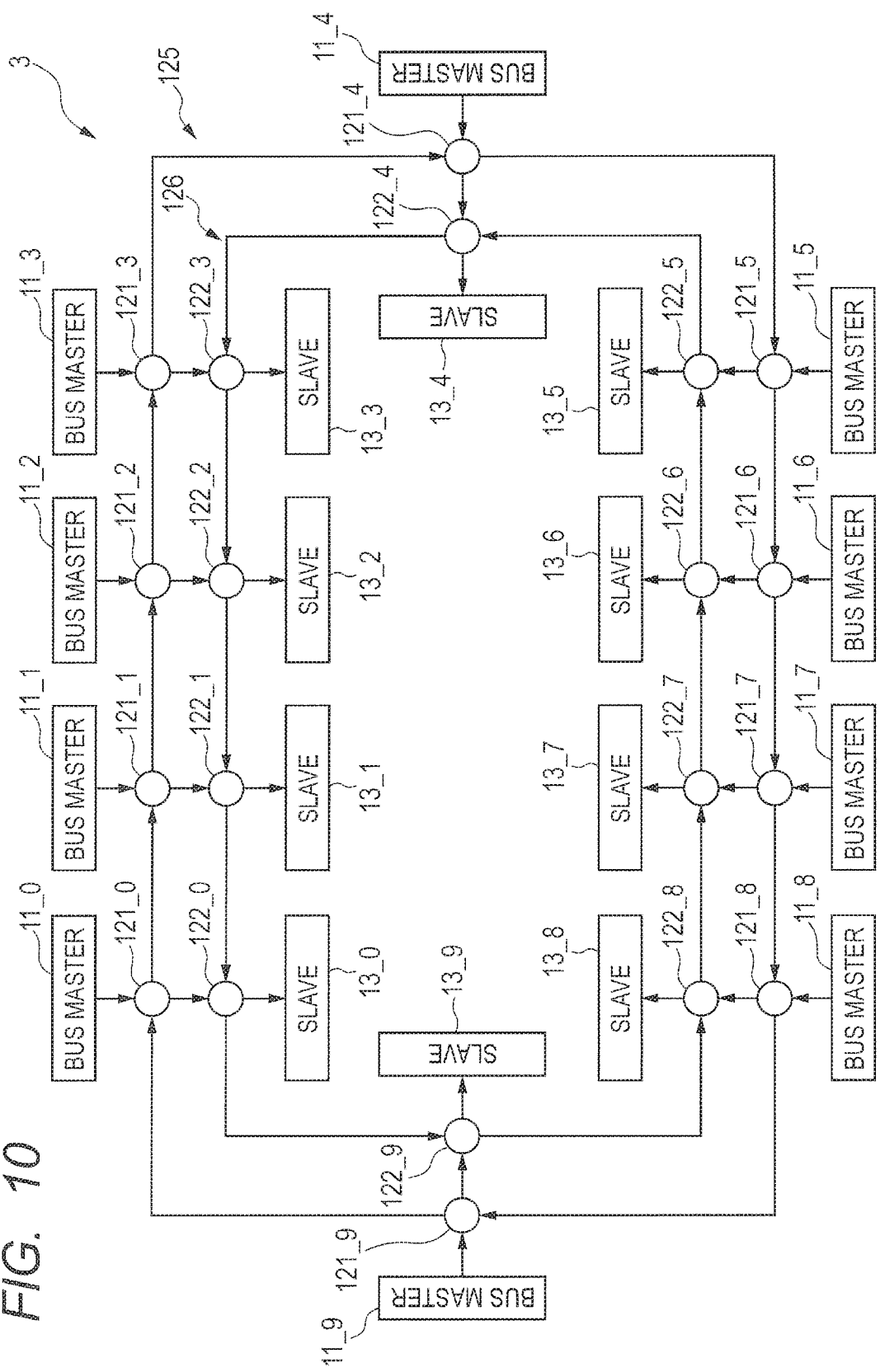
FIG. 10 is a block diagram showing a configuration example of a data processor according to Embodiment 4.

Next, Embodiment 4 will be explained. FIG. 10 is a block diagram showing a configuration example of a data processor according to Embodiment 4. The data processor according to Embodiment 4 differs from the data processor explained in Embodiment 1 to 3 in that, in addition to the ring bus capable of transferring data in both directions, i.e., the ring bus capable of transferring data clockwise, it includes a ring bus capable of transferring data counterclockwise. Since the other parts of the configuration and the operation are the same as those of the data processor explained in Embodiments 1 to 3, the same symbols are attached to component that are the same, and the description thereof is omitted.

As shown in FIG. 10, the data processor 3 includes: a plurality of bus masters 11_0 to 11_9; a plurality of relay circuits 121_0 to 121_9, 122_0 to 122_9; and a plurality of slaves 13_0 to 13_9.

Each of the relay circuits 121_0 to 121_9 is coupled with each of the bus master 11_0 to 11_9 and each of the relay circuits 122_0 to 122_9. The relay circuits 121_0 to 121_9 are coupled in the shape of a ring via a ring bus 125 capable of transferring data clockwise.

Each of the relay circuits 122_0 to 122_9 is coupled with each of the slaves 13_0 to 13_9 and each of the relay circuits 121_0 to 121_9. The relay circuits 122_0 to 122_9 are coupled in the shape of a ring via a ring bus 126 capable of transferring data counterclockwise.

Each of the bus masters 11_0 to 11_9 can makes access to each of the slaves 13_0 to 13_9 via each of the relay circuits 121_0 to 121_9, 122_0 to 122_9, and the ring buses 125 and 126.

For example, when the bus master 11_1 transmits a bus packet to the slave 13_4, it sends the bus packet to the slave 13_4 via the relay circuits 121_1, 121_2, 121_3, and 121_4, in this order, and also via the relay circuit 122_4.

Each of the relay circuits 121_0 to 121_9 and 122_0 to 122_9 has the same configuration as that of the relay circuit 12_1 shown in FIG. 2. Therefore, each of the relay circuits 121_0 to 121_9 and 122_0 to 122_9 can arbitrate the conflicting request packets with use of priority of each request packet.

For example, request packets from an adjacent relay circuit 121_0 (that is, a relay circuit immediately before) is supplied to the relay circuit 121_1 in addition to the request packet from the bus master 11_1. When the request packet of the adjacent relay circuit 121_0 and the request packet of the nearest bus master 11_1 conflict with each other, the relay circuit 121_1 arbitrates these request packets and sends the request packet after arbitration to the relay circuit 122_1 or the next relay circuit 121_2 of the ring bus 126. At this time, the relay circuit 121_1 arbitrates each request packet using the priority of each request packet.

Moreover, for example, the request packet from the relay circuit 121_1 of the ring bus 125 and the request packet from the adjacent relay circuit 122_2 (that is, a relay circuit immediately before) are supplied to the relay circuit 122_1. When the request packet from the relay circuit 121_1 and the request packet from the relay circuit 122_2 conflict with each other, the relay circuit 122_1 arbitrates between these request packets and sends the request packet after arbitration to a next relay circuit 122_0 or the slave 13_1. At this time, the relay circuit 122_1 arbitrates the request packets with use of priority of respective request packets.

Moreover, each of the relay circuits 121_0 to 121_9 includes a priority adjustment circuit which adjusts the priority of a request packet according to the number of relay circuits through which the request packet of each of the bus masters 11_0 to 11_9 passes before reaching its destination. Since the priority adjustment circuit is the same as the priority adjustment circuit 73 of FIG. 4, the description thereof is omitted.

In addition, according to the present embodiment, a predetermined threshold value stored in the table 75 included in the priority adjustment circuit 73 is determined based on a route in consideration of both the clockwise ring bus 125 and the counterclockwise ring bus 126. For example, if based on the bus master 11_1, a slave 13_6 becomes the access destination farthest from the bus master 11_1 (i.e., the number of relay circuits to pass through is greatest) from the bus master 11_1. Further, for example, a slave 13_5 and a slave 13_7 become access destinations of the same distance from the bus master 11_1. Still further, the slave 13_1 becomes the nearest access destination (i.e., fewest relay circuits to pass through) from the bus master 11_1.

The data processor 3 according to the present embodiment includes the ring bus 125 which can transfer data clockwise and the ring bus 126 which can transfer data counterclockwise. Therefore, the path through which each of the bus masters 11_0 to 11_9 sends a request packet to each of the slaves 13_0 to 13_9 can be shortened.

Moreover, when passing through the clockwise ring bus, even when the threshold value (refer to FIG. 5) defined in the table must be set small, if a counterclockwise ring bus can be used, the threshold value defined in the table can be set as a large number (that is, the threshold value doesn't have to be small uselessly). As a result, the request whose priority is very high can be made easy to be transferred.

Embodiment 5

Figure 11:
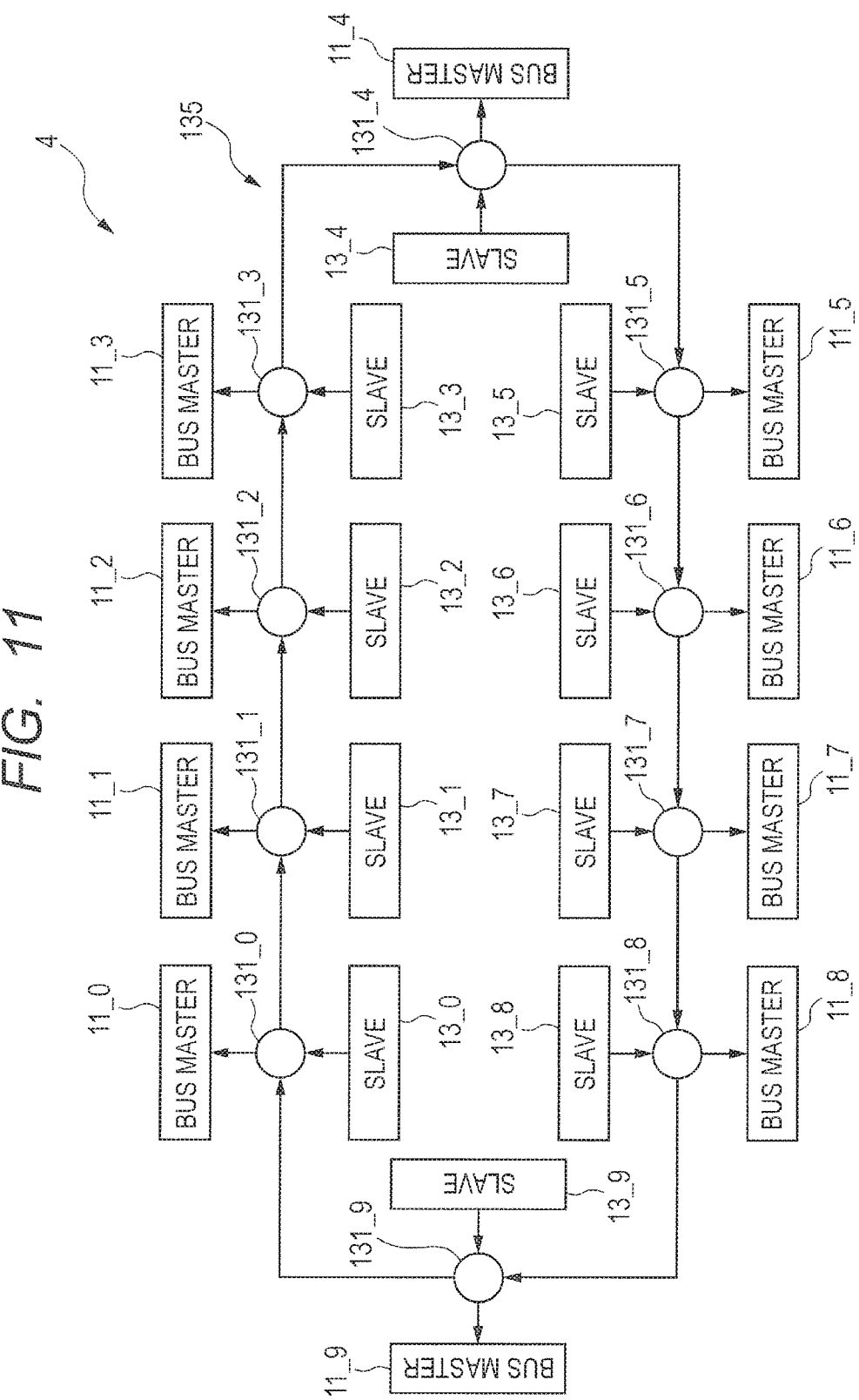
FIG. 11 is a block diagram showing a configuration example of a data processor according to Embodiment 5.

Next, Embodiment 5 will be explained. FIG. 11 is a block diagram showing a configuration example of a data processor according to Embodiment 5. The data processor 4 differs from the data processors explained in Embodiments 1 to 4 in that each of the slaves 13_0 to 13_9 returns a response packet to each of the bus masters 11_0 to 11_9. Since the other parts of the configuration and the operation is the same as those of the data processor explained in Embodiments 1 to 4, the same symbols are attached to the components that are the same, and the description thereof is omitted.

As shown in FIG. 11, the data processor 4 includes: the bus masters 11_0 to 11_9; relay circuits 131_0 to 131_9; and the slaves 13_0 to 13_9.

The relay circuits 131_0 to 131_9 are relay circuits for response, and are coupled with the bus masters 11_0 to 11_9 and the slave 13_0 to 13_9. The relay circuits 131_0 to 131_9 are coupled in the shape of a ring through the ring bus 135 for response. Therefore, the slaves 13_0 to 13_9 can return response packets to the bus masters 11_0 to 11_9 via the relay circuits 131_0 to 131_9 and the ring bus 135. The ring bus 135 is so configured as to be able to transfer data in one direction (clockwise in FIG. 11). In addition, a response packet is basically configured similar to the request packet 80 shown in FIG. 6. However, the "master ID" is replaced with the "slave IS."

For example, when a slave 13_1 returns a response packet to a bus master 11_8, that is, when the address of a destination in the response packet indicates a bus master 11_8, the response packet outputted from the slave 13_1 is sent to the bus master 11_8 in due order via the relay circuit 131_1 to 131_8 coupled to the ring bus 135.

As one example, in the data processor 4 shown in FIG. 11, there are ten bus masters 11_0 to 11_9, ten relay circuits 131_0 to 131_9, and ten slaves 13_0 to 13_9. According to the present embodiment, however, the number of bus masters, relay circuits, and slaves included in Embodiment 1 can be determined arbitrarily.

In the data processor 1 of the present embodiment, in addition to the response packets from the slave 13_1, response packets from the adjacent relay circuit 131_0 (that is, a relay circuit immediately before) are supplied to the relay circuit 131_1. When the response packet of the adjacent relay circuit 131_0 and the response packet of the nearest slave 13_1 conflict with each other, the relay circuit 131_1 allows these response packets to be arbitrated, and sends the arbitrated response packets to the bus master 11_1 or a next relay circuit 131_2. At this time, the relay circuit 131_1 arbitrates the response packet using the priority of the response packets.

A configuration of each of the relay circuits 131_0 to 131_9 included in the data processor 4 of the present embodiment is basically the same as the configuration of the relay circuit 12_1 shown in FIGS. 2 to 3. However, the request packets of the bus master in FIGS. 2 to 4 are replaced with the response packets of the slave. That is, the address (Mst.address) of a bus master, a valid signal (Mst.valid), priority (Mst.priority) and a packet (Mst.packet) of the bus master are replaced with the address (Slv.address), a valid signal (Slv.valid), priority (Slv.priority), and a packet (Slv.packet) of the slave, respectively.

In the data processor 4 according to the present embodiment also, each of the relay circuits 131_0 to 131_9 is provided with a priority adjustment circuit (refer to the priority adjustment circuit 73 of FIG. 4) which adjusts the priority of the response packet according to the number of relay circuits through which the response packet of the slave passes before reaching its destination. For example, the priority adjustment circuit 73 adjusts the priority of the response packet according to the destination of the response packet of a slave 13_1. Specifically, the priority adjustment circuit 73 so adjusts as to allow the priority (Slv.priority) of the response packet of the slave 11_1 to be higher when the number of times the response packet of the slave 13_1 is rejected in the arbitration circuit 71 exceeds a predetermined threshold value. At this time, the predetermined threshold value is set such that the greater the number of the relay circuits 131_0 to 131_9 through which the response packet of the slave 13_1 passes before reaching its destination is, the smaller the predetermined threshold value becomes. In addition, when the priority (Slv.priority) of the response packet has not been adjusted in the priority adjustment circuit 73, the priority adjustment circuit 73 outputs the priority (Slv.priority) to the arbitration circuit 71 as priority (Mod.priority).

Since the operation for the priority adjustment circuit to adjust priority of the response packets according to the destination of response packets of the slave is the same as that explained in Embodiment 1, the description thereof is omitted. In the data processor according to the present embodiment also, it becomes possible to suppress variation in latency when the slave makes access to the bus master.

For example, in the arbitration of the request packets explained in Embodiment 1, when a value obtained by subtracting a threshold value defined in the table 75 from the value of the counter 78 (refer to FIG. 4) is positive, this means that the number of times the value (counter value–threshold value) indicates has exceeded the permissive value of the number of defeat times. When this value is large, it means that the number of defeat times is large on the request side and that it has taken time to make an access. Consequently, it is necessary to raise the priority of the response packet on the response side. Therefore, if the above value is added to the request packet, according to the value, priority and a threshold value of the response packet can be set, and an access status on the request side can be reflected on the response side. As a result, it becomes possible to adjust access latency, considering round-trip access time comprehensively.

Incidentally, in the data processor, the operation where the bus master sends the request packet to the slave and slave returns the response packet to the bus master is repeated. Therefore, it is preferable that the data processor includes both the configuration (configuration on the request side) explained in Embodiment 1 and the configuration (configuration on the response side) explained in Embodiment 5.

However, the priority adjustment circuit may be provided on the request side alone of the data processor (Configuration in Embodiment 1) or the priority adjustment circuit may be provided on the response side alone of the data processor (Configuration in Embodiment 5).

Although the invention made above by the present inventors has been described specifically on the basis of the preferred embodiments, the present invention is not limited to the embodiments referred to above. It is needless to say that various changes can be made thereto within the scope not departing from the gist thereof.

What is claimed is:

1. A data processor, comprising:
a plurality of bus masters;
a plurality of slaves to which the bus masters can make access;
a plurality of relay circuits each of which is coupled to each of the bus masters and each of the slaves; and
a ring bus through which the relay circuits are coupled in the shape of a ring,
wherein the relay circuit includes:
an arbitration circuit which arbitrates an adjacent request packet being a request packet of an adjacent relay circuit and a bus request packet being a request packet of a nearest bus master with use of priority of the adjacent request packet and priority of the bus request packet when the adjacent request packet and the bus request packet conflict each other, and outputs the request packet after arbitration to a next relay circuit; and a priority adjustment circuit which adjusts the priority of the bus request packet according to the number of the relay circuits through which the bus request packet passes before reaching its destination.

2. The data processor according to claim 1,
wherein the priority adjustment circuit is so configured as to adjust such that the priority of the bus request packet becomes higher when the number of times the bus request packet is rejected in the arbitration circuit exceeds a predetermine threshold value, and
wherein the predetermined threshold value is set such that the greater the number of the relay circuits through which the bus request packet passes before reaching its destination is, the smaller the predetermined threshold value is.

3. The data processor according to claim 1 further comprising a monitor circuit which monitors the amount of request packets in the ring bus,
wherein the monitor circuit limits request packets to be sent to the relay circuit from the bus master according to the amount of request packets in the ring bus.

4. The data processor according to claim 1,
wherein the relay circuit includes a buffer circuit which temporarily holds the request packets outputted from the arbitration circuit, and
wherein the buffer circuit is so configured as to be able to change the order of the request packets to be outputted to a next destination according to the priority of the request packets.

5. The data processor according to claim 1,
wherein the ring bus includes:
a first ring bus which transfers request packets in a first direction; and
a second ring bus which transfers request packets in a second direction being opposite to the first direction, and
wherein the relay circuit is provided in each of the first and second ring buses.

6. The data processor according to claim 1 further comprising:
a relay circuit for response being coupled to each of the bus masters and each of the slaves; and
a ring bus for response through which the relay circuits for response are coupled in the shape of a ring,
wherein the relay circuit for response includes:
an arbitration circuit for response which arbitrates an adjacent response packet being a response packet of an adjacent relay circuit and a slave response packet being a response packet of a nearest slave with use of priority of the adjacent response packet and priority of the slave response packet, and outputs the response packet after arbitration to a next relay circuit; and
a priority adjustment circuit for response which adjusts the priority of the slave response packet according to the number of relay circuits for response through which the slave response packet passes before reaching its destination.

7. The data processor according to claim 1,
wherein the priority adjustment circuit is configured to adjust the priority of the bus request packet when the bus request packet is rejected for predetermined number of times by the arbitration circuit.

8. The data processor according to claim 2,
wherein the priority adjustment circuit includes:
a table in which the predetermined threshold value is stored;
a counter which counts the number of times the bus request packet is rejected in the arbitration circuit;
a comparison circuit which compares the number of times the bus request packet is rejected in the arbitration circuit with the predetermined threshold value; and
an adding circuit which adds a predetermined value to priority of the bus request packet when the number of times the bus request packet is rejected exceeds the predetermined threshold value.

9. The data processor according to claim 3,
wherein the relay circuit includes a buffer circuit which temporarily holds request packets outputted from the arbitration circuit, and
wherein the monitor circuit monitors the amount of request packets in the ring bus by monitoring the amount of request packets held in the buffer circuit.

10. The data processor according to claim 4,
wherein the buffer circuit includes:
a first holding circuit capable of holding a first request packet;
a second holding circuit which is provided immediately after the first holding circuit and is capable of holding a second request packet; and
a selection circuit which selects one of the first request packet held in the first holding circuit and the second request packet held in the second holding circuit, and
wherein the selection circuit selects and outputs the request packet having higher priority out of the first and second request packets.

11. The data processor according to claim 8, wherein, after adding the predetermined value to the priority of the bus request packet, the adding circuit further adds a predetermined value to the priority of the bus request packet again when the bus request packet is rejected in the arbitration circuit.

12. The data processor according to claim 9,
wherein the monitor circuit limits request packets to be supplied to each of the relay circuits from each of the bus masters when there is no vacancy in at least one of the buffer circuits included in the respective relay circuits.

13. A data processor, comprising:
a plurality of bus masters;
a plurality of slaves to which the bus masters can make access;
a plurality of relay circuits each of which is coupled to each of the bus masters and each of the slaves; and
a ring bus through which the relay circuits are coupled in the shape of a ring,
wherein the relay circuit includes:
an arbitration circuit which arbitrates an adjacent response packet being a response packet of an adjacent relay circuit and a slave response packet being a response packet of a nearest slave with use of priority of the adjacent response packet and priority of the slave response packet when the adjacent response packet and the slave response packet conflict each other, and outputs the response packet after arbitration to a next relay circuit; and a priority adjustment circuit which adjusts the priority of the slave response packet according to the number of the relay circuits through which the slave response packet passes before reaching its destination.

14. A method for controlling a data processor, the data processor comprising:
   a plurality of bus masters;
   a plurality of slaves to which the bus masters make access;
   a plurality of relay circuits each of which is coupled to each of the bus masters and each of the slaves; and
   a ring bus through which the relay circuits are coupled in the shape of a ring,
   wherein, when arbitrating an adjacent request packet being a request packet of an adjacent relay circuit and a bus request packet being a request packet of a nearest bus master with use of priority of the adjacent request packet and priority of the bus request packet when the adjacent request packet and the bus request packet conflict each other, the relay circuit adjusts the priority of the bus request packet according to the number of the rely circuits through which the bus request packet passes before reaching its destination.

* * * * *